(12) United States Patent
Itagaki

(10) Patent No.: US 7,886,216 B2
(45) Date of Patent: Feb. 8, 2011

(54) PROCESSING APPARATUS, JOB EXECUTION APPARATUS, METHOD FOR CONTROLLING THE PROCESSING APPARATUS AND STORAGE MEDIUM

(75) Inventor: Kazuhiro Itagaki, Toyonaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1233 days.

(21) Appl. No.: 11/476,633

(22) Filed: Jun. 29, 2006

(65) Prior Publication Data

US 2007/0127061 A1    Jun. 7, 2007

(30) Foreign Application Priority Data

Dec. 2, 2005    (JP)    ............................ 2005-349766

(51) Int. Cl.
*G06F 17/00*    (2006.01)

(52) U.S. Cl. ...................................... 715/200

(58) Field of Classification Search ................ 715/200, 715/255; 340/5.6
See application file for complete search history.

(56) References Cited

U.S. PATENT DOCUMENTS

| | | | | |
|---|---|---|---|---|
| 5,280,517 | A * | 1/1994 | Matsumoto | 379/70 |
| 5,347,580 | A * | 9/1994 | Molva et al. | 713/159 |
| 6,032,055 | A * | 2/2000 | Yazaki et al. | 455/558 |
| 6,157,734 | A * | 12/2000 | Iida | 382/162 |
| 6,188,309 | B1 * | 2/2001 | Levine | 340/5.66 |
| 6,792,399 | B1 * | 9/2004 | Phillips et al. | 705/36 R |
| 6,879,965 | B2 * | 4/2005 | Fung et al. | 705/39 |
| 6,922,724 | B1 * | 7/2005 | Freeman et al. | 709/223 |
| 6,938,079 | B1 * | 8/2005 | Anderson et al. | 709/222 |
| 6,963,830 | B1 * | 11/2005 | Nakao | 704/1 |
| 7,436,306 | B2 * | 10/2008 | Berger et al. | 340/572.4 |
| 7,685,037 | B2 * | 3/2010 | Reiners et al. | 705/35 |
| 2002/0099274 | A1 * | 7/2002 | Isomura et al. | 600/300 |
| 2003/0069835 | A1 * | 4/2003 | Tsuno | 705/37 |
| 2003/0236877 | A1 * | 12/2003 | Allan | 709/224 |
| 2005/0102617 | A1 * | 5/2005 | Nagahara et al. | 715/517 |
| 2005/0144136 | A1 * | 6/2005 | Murashita | 705/51 |
| 2005/0166142 | A1 * | 7/2005 | Mise et al. | 715/517 |

(Continued)

FOREIGN PATENT DOCUMENTS

JP    9-218695    8/1997

(Continued)

OTHER PUBLICATIONS

Kinoshita et al., Privacy Enhanced Active RFID Tag, Google 2005, pp. 1-5.*

(Continued)

*Primary Examiner*—Cong-Lac Huynh
(74) *Attorney, Agent, or Firm*—Morrison & Foerster LLP

(57) ABSTRACT

An IC card reader/writer is connected to an image forming apparatus in advance. The image forming apparatus is provided with a job database for storing job information for one or more jobs in association with the number of reads of a user card respectively, a number of reads count portion for counting the number of reads that a user continually made the IC card reader/writer read the user ID, and a job execution control portion for performing control processing so that execution of a job for processing contents is started. The processing contents correspond to the number of reads that was counted and are stored in the job database.

17 Claims, 23 Drawing Sheets

U.S. PATENT DOCUMENTS

| | | | |
|---|---|---|---|
| 2006/0189843 A1* | 8/2006 | Nakamura et al. | 600/118 |
| 2007/0106420 A1* | 5/2007 | Wyrwoll | 700/200 |
| 2008/0098232 A1* | 4/2008 | Miyazaki et al. | 713/176 |
| 2008/0297821 A1* | 12/2008 | Shibao | 358/1.9 |

FOREIGN PATENT DOCUMENTS

| | | |
|---|---|---|
| JP | 10-124634 | 5/1998 |
| JP | 2001-125719 | 5/2001 |
| JP | 2001-148753 A | 5/2001 |

OTHER PUBLICATIONS

Hou et al., Some Operating System Issues in Personal Digital Assistant, Google 2001, pp. 1-9.*

Japanese Office Action mailed on Jun. 3, 2008 directed towards counterpart foreign application No. 2005-349766; 5 pages.

* cited by examiner

| USER ID | NAME | PASSWORD | DEPARTMENT | DEPARTMENT ID | ... | |
|---------|-------|----------|------------|---------------|-----|---|
| U001 | AAAAA | u)ew2d# | SALES DEPARTMENT | B01 | ... | ~6DU |
| U002 | BBBBB | 09se4D1 | ACCOUNTING DEPARTMENT | B03 | ... | ~6DU |
| U003 | CCCCC | aDa9l$E | DEVELOPMENT DEPARTMENT | B02 | ... | ~6DU |
| ⋮ | ⋮ | ⋮ | ⋮ | ⋮ | ⋮ | ~6DU |

|  | PRINT COPIES: | 1 |
|---|---|---|
| ○ SINGLE SIDED PRINTING | ○ COLOR PRINTING | |
| ○ DUPLEX PRINTING | ○ MONOCHROME PRINTING | |
| ○ STAPLED | ○ PUNCHED | |
| ○ UNSTAPLED | ○ UNPUNCHED | |
| SUSPEND | OK | CANCEL |

| JOB ID | JOB DATA | USER ID OF REQUEST SOURCE | EXECUTION START CONDITIONS | |
|---|---|---|---|---|
| J001 | JOB DATA | U001 | THREE TIMES | ~6HJ |
| J002 | JOB DATA | U002 | THREE TIMES | ~6HJ |
| J003 | JOB DATA | U003 | FOUR TIMES | ~6HJ |
| J004 | JOB DATA | U001 | FOUR TIMES | ~6HJ |
| J005 | JOB DATA | U005 | THREE TIMES | ~6HJ |
| J006 | JOB DATA | U002 | TWICE | ~6HJ |
| ⋮ | ⋮ | ⋮ | ⋮ | |

| PICTURE IDENTIFICATION INFORMATION | USER ID | DISPLAY CONDITIONS (NUMBER OF READS) | |
|---|---|---:|---|
| PC GROUP LIST PICTURE | U001 | THREE TIMES | 6DG |
| ASSOCIATED COMPANY MEMBER PICTURE | U002 | THREE TIMES | 6DG |
| PC GROUP LIST PICTURE | U003 | FOUR TIMES | 6DG |
| SALES DEPARTMENT PC MEMBER PICTURE | U001 | FOUR TIMES | 6DG |
| BOX JOB DESIGNATION PICTURE | U005 | ONCE | 6DG |
| SCAN JOB DESIGNATION PICTURE | U002 | FIVE TIMES | 6DG |
| ⋮ | ⋮ | ⋮ | |

| USER ID | NAME | PASSWORD | DEPARTMENT | DEPARTMENT ID | NECESSARY NUMBER OF READS IN LOGGING IN Sm | NECESSARY NUMBER OF READS IN LOGGING OUT Sn | LOCK FLAG RFG | |
|---|---|---|---|---|---|---|---|---|
| U001 | AAAAA | u)ew2d# | SALES DEPARTMENT | B01 | FOUR TIMES | FIVE TIMES | 0 | ... ~6FU |
| U002 | BBBBB | 09se4D1 | ACCOUNTING DEPARTMENT | B03 | THREE TIMES | FIVE TIMES | 1 | ... ~6FU |
| U003 | CCCCC | aDa9l$E | DEVELOPMENT DEPARTMENT | B02 | FIVE TIMES | FOUR TIMES | 0 | ... ~6FU |
| ... | ... | ... | ... | ... | ... | ... | ... | ... |

| CARD ID | USER ID | NECESSARY NUMBER OF READS IN LOGGING IN |
|---|---|---|
| 6DC~ C001 | U101 | FOUR TIMES |
| | U102 | FIVE TIMES |
| | U103 | THREE TIMES |
| 6DC~ C002 | U121 | THREE TIMES |
| | U122 | FIVE TIMES |
| 6DC~ C003 | U131 | TWICE |
| | U132 | SIX TIMES |
| | U133 | FIVE TIMES |
| | U134 | SEVEN TIMES |
| ⋮ | ⋮ | ⋮ |

PROCESSING APPARATUS, JOB EXECUTION APPARATUS, METHOD FOR CONTROLLING THE PROCESSING APPARATUS AND STORAGE MEDIUM

This application is based on Japanese Patent Application No. 2005-349766 filed on Dec. 2, 2005, the contents of which are hereby incorporated by reference.

BACKGROUND OF THE INVENTION

1. Field of the Invention

The present invention relates to processing apparatuses such as image forming apparatuses and a method for controlling the processing apparatuses.

2. Description of the Related Art

Various types of processing apparatuses, which are generally called OA (Office Automation) equipment, have been used in offices of companies, public offices or the like. The processing apparatuses are provided with various functions. For example, image forming apparatuses that are called multifunction devices or MFP (Multi Function Peripherals) have been provided with functions of a copier, a scanner and a fax machine. The image forming apparatuses are provided with functions of a network printer, a document server (a so-called personal box) and a file transfer facility these days. This greatly increases the types of processing that can be executed.

However, the increase in type of executable processing makes it difficult for users to operate processing apparatuses. Even people who have professional expertise may sometimes take time to perform an operation for designating desired processing.

There is proposed a method as described in Japanese unexamined patent publication No. 2001-148753. According to the method, when a user inserts an IC card with his or her user ID into an IC card reader, a user authentication part reads the user ID out and collates it with a user DB. When the authentication proves successful, a reservation management part performs retrieval from a reservation DB by using the user ID as a key. When a plurality of reservations is registered, a reservation list including various pieces of information are displayed on a display panel to wait for the user to select one of the reservations by using reservation select keys. Then, read conditions and an image transmission method are taken out of the reservation and the settings of an image read part and an image transmission part are changed. After that, the user presses a start button of a scanner and then a document is read under the set conditions to send the read image data.

In the method described in Japanese unexamined patent publication No. 2001-148753, however, it is necessary for a user to find out and select a reservation of desired processing from a reservation list, which is still bothersome for the user.

SUMMARY OF THE INVENTION

The present invention is directed to solve the problems pointed out above, and therefore, an object of the present invention is to enable a user to select his/her desired processing easily in a processing apparatus capable of executing various types of processing compared to conventional cases.

According to one aspect of the present invention, a processing apparatus includes an interface for connecting to a reading device reading information from a portable storage medium, a memory device for storing one or more processing contents in association with number of reads of predetermined information respectively, a counter for counting number of reads that a user continually made the reading device read the predetermined information recorded on the storage medium, and a controller for performing control processing so that execution of processing for the processing contents is started, the processing contents corresponding to the number of reads that was counted by the counter and being stored in the memory device.

Preferably, the processing apparatus further includes a receiving portion for receiving designation of contents of processing desired by the user. In the processing apparatus, the memory device stores, as the processing contents, contents relating to the designation received by the receiving portion.

When a user designates a job, in some cases, the memory device stores the processing contents only with respect to a part of steps of the job. For example, when the user designates a copy job including a step of scanning an original (a scan step) and a step of printing a scanned image (a print step), the scan step is executed first irrespective of the number of input times of the predetermined information and the memory device stores contents of the print step as the processing contents. When the predetermined information is inputted the number of input times corresponding to the print step, the controller performs control processing so that execution of the print step is started.

The present invention makes it possible for a user to select his/her desired processing easily compared to conventional cases.

BRIEF DESCRIPTION OF THE DRAWINGS

FIG. 5 shows an example of a user information database.

FIG. 8 is a diagram showing an example of a print command dialog box.

FIG. 10 shows an example of a suspended job database.

FIG. 14 shows an example of a picture setting database.

FIG. 18 shows an example of a user information database.

FIG. 22 shows an example of a card information database.

DESCRIPTION OF THE PREFERRED EMBODIMENTS

First Embodiment

Figure 1:
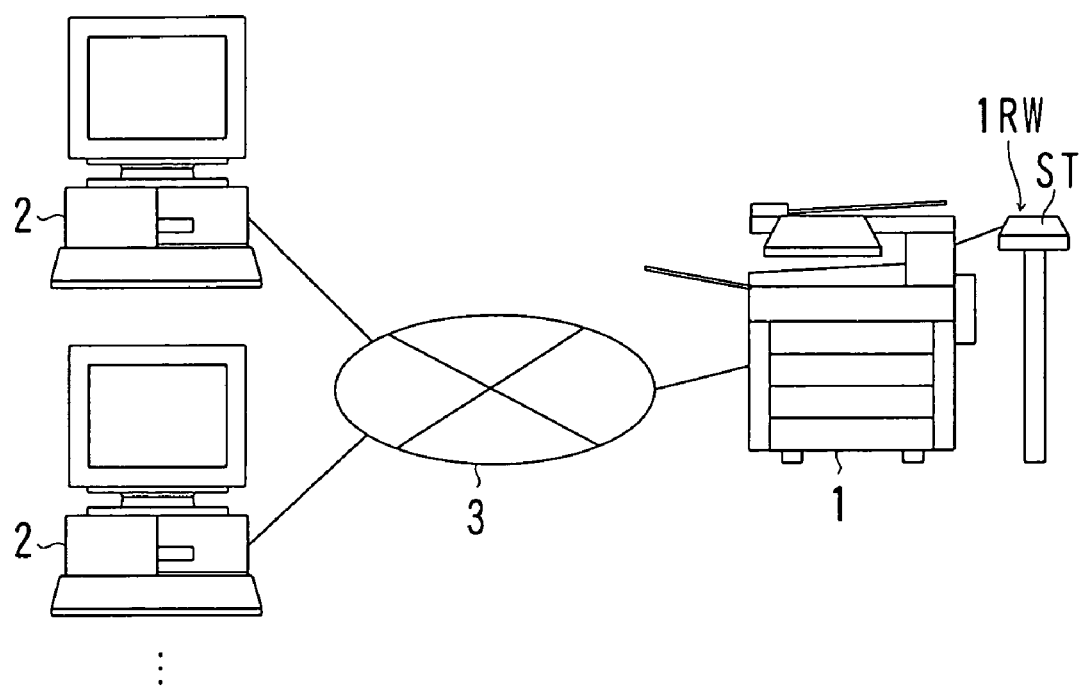
FIG. 1 is a diagram showing an example of an overall configuration of a system including an image forming apparatus.
Figure 2:
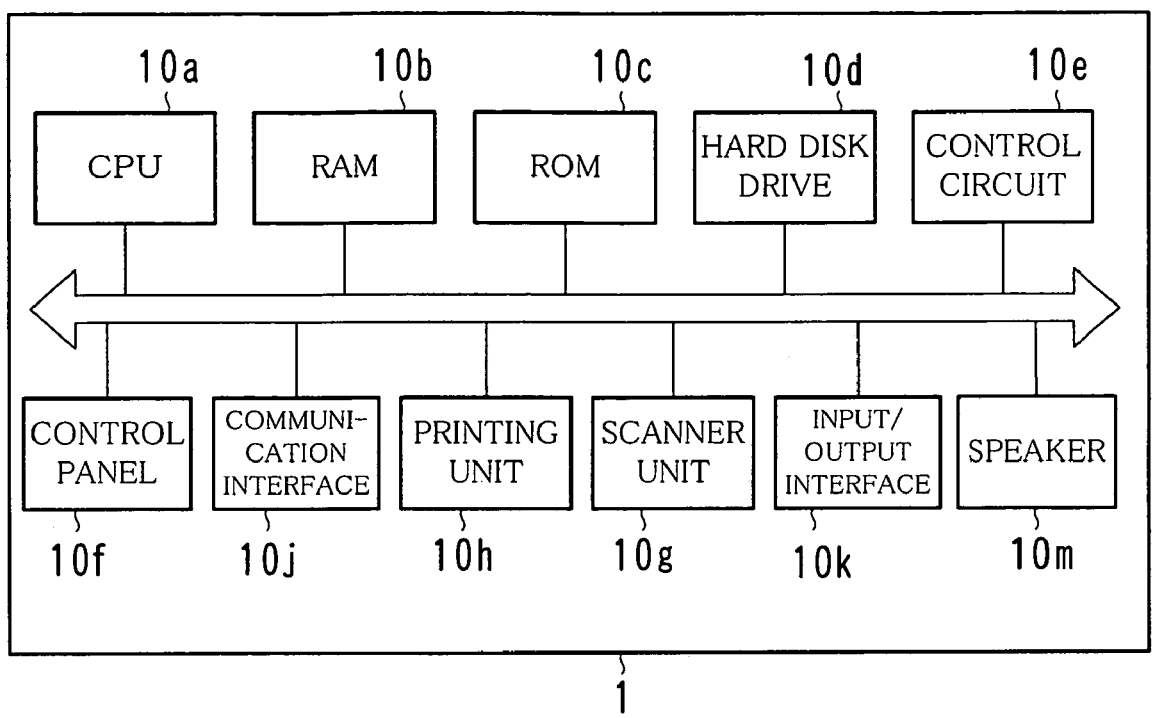
FIG. 2 is a diagram showing an example of a hardware configuration of the image forming apparatus.
Figure 3:
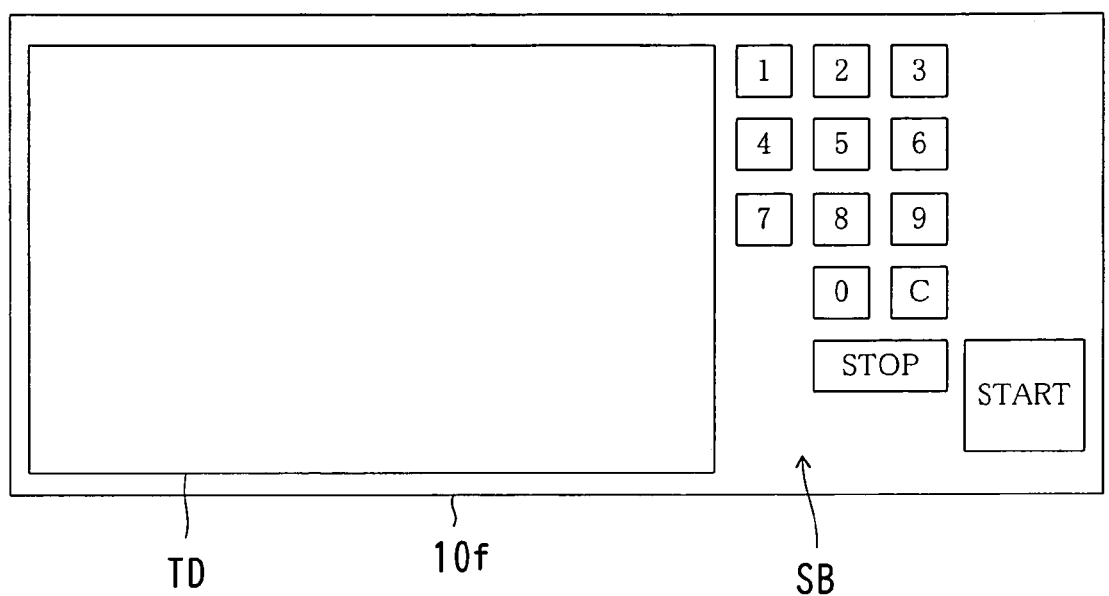
FIG. 3 is a diagram showing an example of a control panel.
Figure 4:
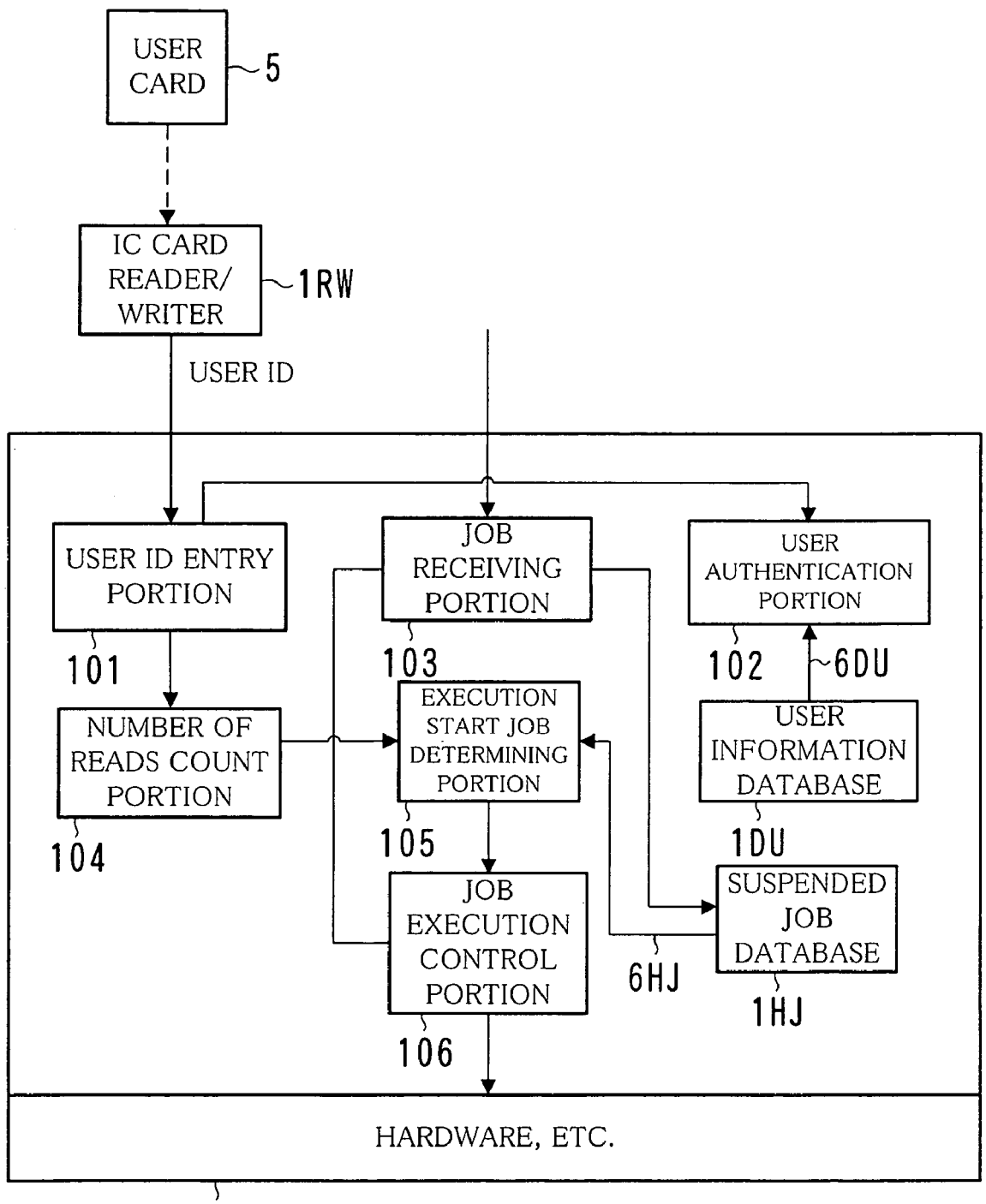
FIG. 4 is a diagram showing an example of a functional configuration of the image forming apparatus according to a first embodiment.

FIG. 1 is a diagram showing an example of an overall configuration of a system including an image forming apparatus 1, FIG. 2 is a diagram showing an example of a hardware configuration of the image forming apparatus 1, FIG. 3 is a diagram showing an example of a control panel 10f and FIG. 4 is a diagram showing an example of a functional configuration of the image forming apparatus 1 according to the first embodiment.

Referring to FIG. 1, the image forming apparatus 1 according to the present invention is interconnected to one or more terminals 2 via a communication line 3 that can be the Internet, a LAN line, a public line or a dedicated line.

Installed on the terminal 2 are application programs and drivers compatible with the image forming apparatus 1. The terminal 2 can be a personal computer, a workstation or others.

The image forming apparatus 1 is a processing apparatus in which functions of a copier, a scanner, a fax machine, a network printer, a document server and others are consolidated. The image forming apparatus 1 is sometimes called a multifunction device or a multifunction peripheral (MFP). "Network printing" is a function for receiving image data from the terminal 2 to print an image on a sheet of paper. Such a function is sometimes called a "network printer function", "PC print function" or the like. "Document server" is a function for allowing a user to save document data such as an image file in his/her storage area that is given to each user. The storage area corresponds to a folder or a directory in a personal computer and is called a "box", a "personal box" or the like. The "document server" may be sometimes called a "box function".

The image forming apparatus 1 can be established in offices of public offices or companies, in public facilities such as schools or libraries, in stores such as convenience stores and in various other places. The image forming apparatus 1 can be shared by plural users.

A user account is given to each user who is authorized to use the image forming apparatus 1. A unique user ID is assigned to each user account in order to distinguish one user account from the other user accounts. Further, each user is given a user card 5 (see FIG. 4) on which a user ID pertaining to his/her user account is recorded. In this embodiment, a case is described in which an IC card is used as the user card 5.

Referring to FIG. 2, the image forming apparatus 1 includes a CPU 10a, a RAM 10b, a ROM 10c, a hard disk drive 10d, a control circuit 10e, a control panel 10f, a scanner unit 10g, a printing unit 10h, a communication interface 10j, an input/output interface 10k and a speaker 10m.

The control circuit 10e is a circuit for controlling the hard disk drive 10d, the scanner unit 10g, the printing unit 10h, the communication interface 10j, the control panel 10f, the input/output interface 10k and the speaker 10m.

The scanner unit 10g is a device for optically reading an image such as a photograph, a character, an illustration or a chart that is depicted on the original paper to generate image data. The printing unit 10h serves to print an image on a sheet of paper based on image data captured by the scanner unit 10g or image data transmitted by the terminal 2. The communication interface 10j is an NIC (Network Interface Card) or a modem for communicating with other devices.

The input/output interface 10k is an interface such as RS-232C, USB, IEEE1394 or SCSI. The image forming apparatus 1 is connected to an IC card reader/writer 1RW (see FIG. 4) via the input/output interface 10k.

Referring to FIG. 3, the control panel 10f includes a control portion SB and a display portion TD. A numeric keypad or the like is used as the control portion SB and a liquid crystal display or the like is used as the display portion TD. A user can operate the control portion SB to give the image forming apparatus 1 a command for starting execution of processing or a command for discontinuing processing, to specify processing conditions including data destination, printing conditions and image file formats and to specify various other matters. On the display portion TD are displayed a picture for giving the user a message or directions, a picture for prompting the user to enter types and conditions of desired processing and a picture for showing results of processing executed by the image forming apparatus 1 or other pictures. When a touch panel is used as the control panel 10f, the touch panel operates as both the control portion SB and the display portion TD. Thus, the control panel 10f fulfills the role of a user interface for the user who operates the image forming apparatus 1. As described earlier, application programs for giving commands to the image forming apparatus 1 and drivers are installed on the terminal 2. Thereby, the user can use the terminal 2 to remotely operate the image forming apparatus 1.

Referring to FIG. 4, the hard disk drive 10d stores programs and data for realizing functions of a user ID entry portion 101, a user authentication portion 102, a job receiving portion 103, a number of reads count portion 104, an execution start job determining portion 105, a job execution control portion 106, a user information database 1DU and a suspended job database 1HJ. These programs are read out to the RAM 10b as required and the programs are executed by the CPU 10a. All or part of these programs or data may be memorized in the ROM 10c. Alternatively, all or part of the functions shown in FIG. 4 may be realized by the control circuit 10e.

The IC card reader/writer 1RW is a device for reading information that is recorded on a user card 5 to transmit the information thus read to the image forming apparatus 1. The IC card reader/writer 1RW sends electromagnetic waves to the user card 5 and receives other electromagnetic waves generated in the user card 5 that received the electromagnetic waves sent from the IC card reader/writer 1RW. Thereby, the IC card reader/writer 1RW reads information from the user card 5. Accordingly, the IC card reader/writer 1RW can read information without contacting the user card 5, i.e., in a non-contact manner. In this embodiment, the IC card reader/writer 1RW is configured to detect a user card 5 that approaches within a few centimeters of a top surface ST (see FIG. 1) to read information from the user card 5. When a user dabs (taps) the user card 5 or a card case containing the same on the top surface ST, the IC card reader/writer 1RW can detect the user card 5 with higher precision.

The IC card reader/writer 1RW is placed in the vicinity of the image forming apparatus 1, e.g., in a position several tens of centimeters to approximately one meter away in the lateral direction from the position of the control panel 10f (see FIG.

1). This allows a user to make the IC card reader/writer 1RW read his/her user card 5 even when another user operates the control panel 10f.

Alternatively, it is also possible that the IC card reader/writer 1RW is integral with the image forming apparatus 1. In such a case, however, the control panel 10f is preferably placed away from the IC card reader/writer 1RW so that two users can respectively use the control panel 10f and the IC card reader/writer 1RW at the same time.

Figure 6:
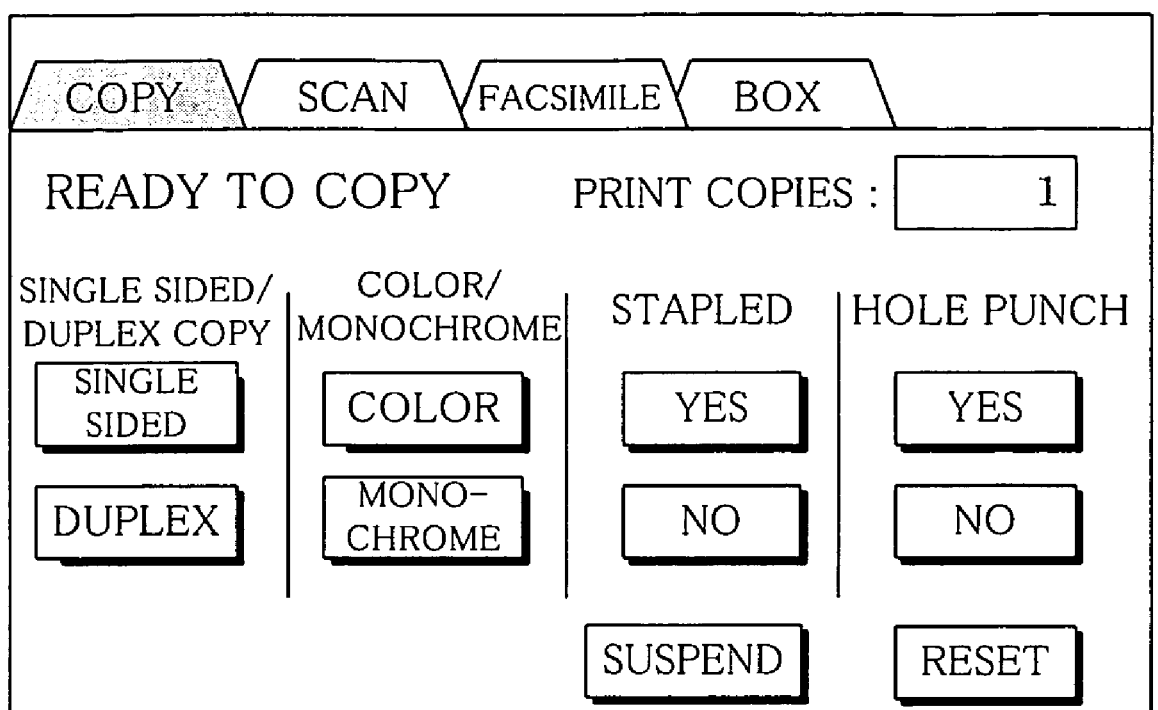
FIG. 6 shows an example of a copy job designation picture.
Figure 7:
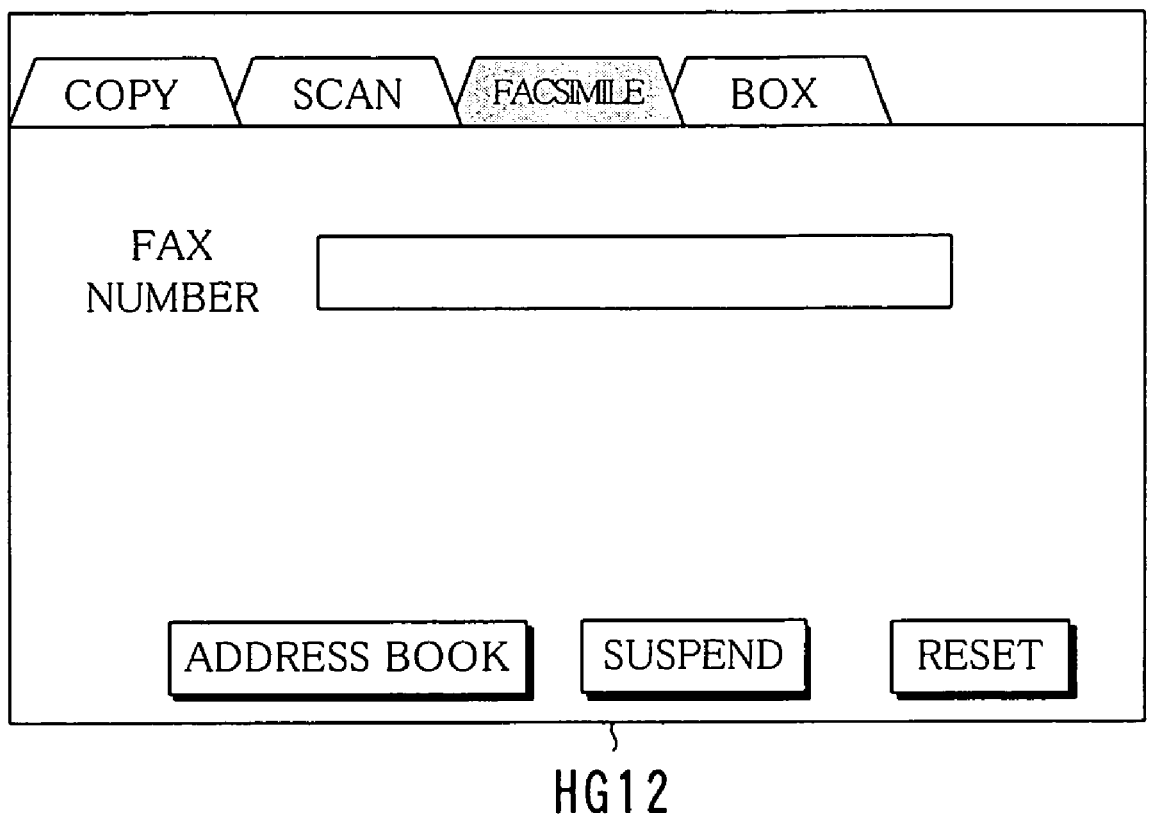
FIG. 7 shows an example of a fax job designation picture.
Figure 9A:
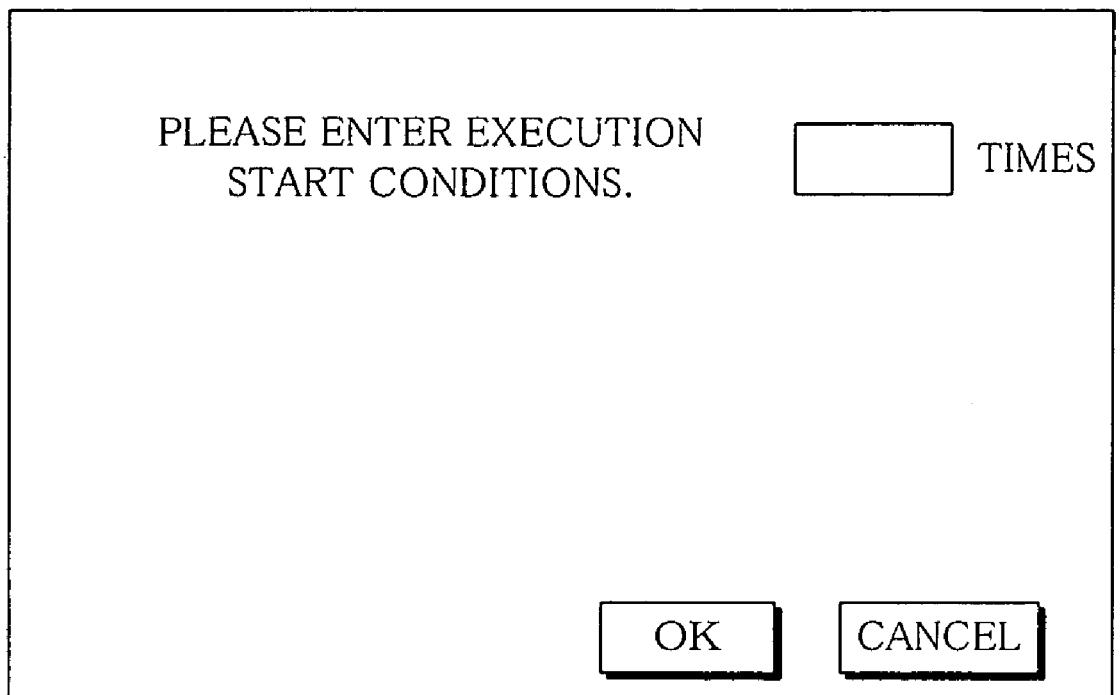
FIGS. 9(A) and 9(B) show an example of pictures used for designating execution start conditions.
Figure 9B:
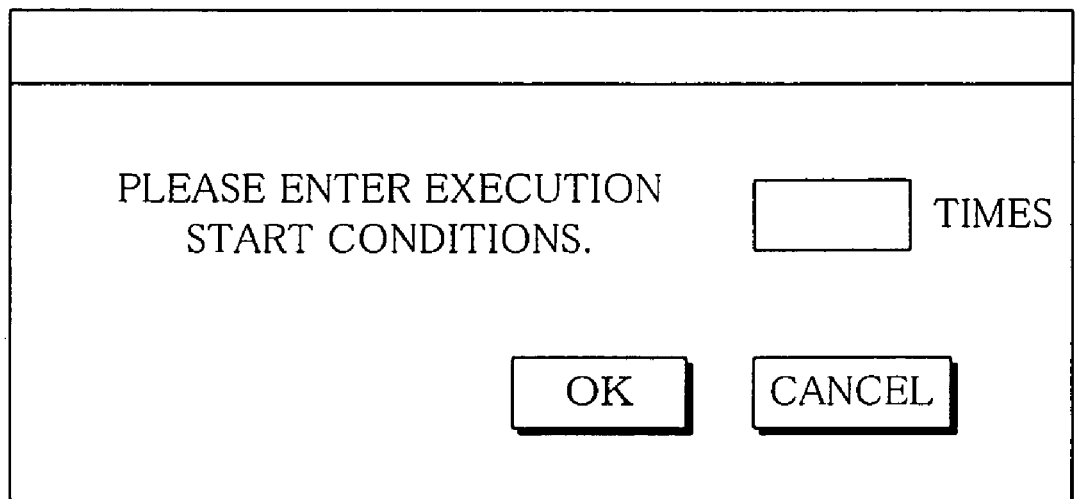

FIG. 5 shows an example of a user information database 1DU, FIG. 6 shows an example of a copy job designation picture HG11, FIG. 7 shows an example of a fax job designation picture HG12, FIG. 8 is a diagram showing an example of a print command dialog box HG21, FIGS. 9(A) and 9(B) show an example of pictures used for designating execution start conditions and FIG. 10 shows an example of a suspended job database 1HJ.

Next, detailed descriptions will be provided of processing contents of the portions included in the image forming apparatus 1 as shown in FIG. 4 in the case where the image forming apparatus 1 is installed in an office of a company and is used by employees of the company.

The user information database 1DU shown in FIG. 4 stores user information 6DU for each user (employee) as shown in FIG. 5. The user information 6DU indicates various types of information on a user including a user ID of a user account, a name and a password of the user and a name of a department to which the user belongs (a department name), and a department ID for identifying the department.

An administrator of the image forming apparatus 1 performs operations concerning the user information 6DU. For example, every time the number of users increases by one, the administrator performs an operation for newly generating user information 6DU of the corresponding user to register the same in the user information database 1DU. Further, along with personnel changes of a user or the like, the administrator performs an operation for changing contents of the user information 6DU of the corresponding user. Moreover, when a user leaves the company or the like, the administrator performs an operation for deleting the user information 6DU of the user from the user information database 1DU.

The IC card reader/writer 1RW reads a user ID from a user card 5 of a user who is about to operate the image forming apparatus 1 directly. Then, the IC card reader/writer 1RW transmits the user ID thus read to the image forming apparatus 1. The user ID entry portion 101 performs processing for entering the user ID from the IC card reader/writer 1RW.

The user authentication portion 102 verifies that the user who is about to operate the image forming apparatus 1 is an authorized user based on the entered user ID. More specifically, the user authentication portion 102 checks whether or not the entered user ID is indicated in any of the plural pieces of user information 6DU stored in the user information database 1DU. When such user information 6DU is found, the user authentication portion 102 verifies that the user is an authorized user. When it is not found, the user authentication portion 102 determines that the user is an unauthorized user.

In some cases, however, the same user ID is entered continually within a predetermined period of time as described later. In such cases, the verification processing described above is performed only on the first time entry and not performed on the second time entry or later.

When a user is about to use the image forming apparatus 1 remotely by using the terminal 2, the user authentication portion 102 requests the user to send a user ID and a password. Responding to this, the user operates the terminal 2 to enter his/her user ID and password, then to make the terminal 2 transmit the same to the image forming apparatus 1. The user authentication portion 102 searches from the user information database 1DU user information 6DU indicative of the user ID thus transmitted. When a password indicated in the user information 6DU thus searched is identical to the password that is transmitted together with the user ID, the user authentication portion 102 verifies the authenticity of the user. When such user information 6DU cannot be searched, or, when both the passwords are not identical, the user authentication portion 102 determines that the user is an unauthorized user.

A user who is authenticated by the user authentication portion 102 logs in to the image forming apparatus 1. The user can use the image forming apparatus 1 until he/she logs out. A user who is determined to be an unauthorized user cannot login to the image forming apparatus 1. Accordingly, the user cannot use the image forming apparatus 1.

The job receiving portion 103 performs processing for receiving designation relating to jobs desired by a user who is currently logging in. The job execution control portion 106 controls the portions of the image forming apparatus 1 so that the received jobs can be executed. The control of the image forming apparatus 1 is performed, for example, by the following procedures.

A user who makes the IC card reader/writer 1RW read a user card 5 to login to the image forming apparatus 1 (hereinafter sometimes referred to as a "local user" to be distinguished from a user who uses the terminal 2 to login to the image forming apparatus 1) operates the control panel 10f to designate a type and processing conditions of a desired job, similarly to conventional cases.

Suppose that the display portion TD of the control panel 10f displays, as shown in FIG. 6, the copy job designation picture HG11 used for designating processing conditions of a job of copying an original (hereinafter referred to as a "copy job"). When the user desires a copy job, the user presses buttons in the copy job designation picture HG11 to select processing conditions, then to press the "START" button in the control portion SB. Responding to this, the job execution control portion 106 controls the scanner unit 10g, the printing unit 10h and others so as to execute the copy job for processing contents specified in the copy job designation picture HG11. More specifically, the job execution control portion 106 controls the scanner unit 10g so that an original sheet set on a document handler is scanned and controls the printing unit 10h so that an image of the original thus obtained is printed on copier paper.

When the user desires a job of transmitting an original via facsimile (hereinafter referred to as a "fax transmission job"), the user presses the "FAX" tab in the copy job designation picture HG11. Responding to this, a picture displayed on the display portion TD is switched from the copy job designation picture HG11 to the fax job designation picture HG12 as shown in FIG. 7. Here, the user operates the numeric keypad and designates a destination fax number, then to press the "START" button. In response to this, the job execution control portion 106 controls the scanner unit 10g, the communication interface 10j and others so as to execute the fax transmission job. More specifically, the job execution control portion 106 controls the scanner unit 10g so that an original sheet set on a document handler is scanned and controls the communication interface 10j to dial the designated fax number so that an image of the original captured by the scanner unit 10g is transmitted to the destination.

A user who operates the terminal 2 to login to the image forming apparatus 1 (hereinafter sometimes referred to as a "network user" to be distinguished from a local user) can remotely make the image forming apparatus 1 execute jobs. For example, the network user can make the image forming apparatus 1 print a document that is prepared by application software installed on the terminal 2, i.e., PC print. In such a case, the user enters a print command with a file of a document to be printed being opened by the application software.

Then, a printer driver of the terminal 2 displays the print command dialog box HG21 as shown in FIG. 8 on the desktop. Here, the user operates the terminal 2 and designates printing conditions, then to click the "OK" button. In response to this, the printer driver generates print data for printing the document to transmit to the image forming apparatus 1 the print data along with data indicative of the printing conditions.

When the job receiving portion 103 in the image forming apparatus 1 receives the data indicative of the printing conditions and the print data from the terminal 2, the job execution control portion 106 controls the printing unit 10h and others so that the print data are used to print the document on copier paper.

Thus, the job execution control portion 106 executes various types of jobs based on processing conditions designated by a user similarly to conventional cases.

In this embodiment, however, users can suspend execution of the entire or a part of steps and give predetermined signs later to start (resume) the execution, instead of starting execution of all steps of a job promptly.

In such a case, the "SUSPEND" button is selected in a picture used for designating processing conditions of various types of jobs, i.e., the copy job designation picture HG11, the fax job designation picture HG12 or the print command dialog box HG21 or others. When the user is a local user, an execution start conditions designation picture HG13 as shown in FIG. 9A is displayed on the display portion TD of the control panel 10f. When the user is a network user, an execution start conditions designation dialog box HG22 as shown in FIG. 9B is displayed on the desktop of the terminal 2.

The user enters conditions for starting execution of suspended processing (hereinafter referred to as "execution start conditions") into these pictures or the dialog box. In this embodiment, the number of times the IC card reader/writer 1RW that is connected to the image forming apparatus 1 reads a user ID of a user account of the user continually (successively) is designated as the execution start conditions.

When the execution start conditions are specified, the job execution control portion 106 suspends execution of the entire or a part of steps of the job. For example, when the job receiving portion 103 receives a request for a copy job, a step up to scanning of an original is executed without suspension and the subsequent steps, i.e., a step of printing a scanned image and others are suspended. Likewise, when a request for a fax transmission job is received, a step up to scanning of an original is executed without suspension and the subsequent steps including a step of transmitting scanned image data to a destination are suspended.

With respect to a job having steps that are suspended entirely or partly in this way, suspended job information 6HJ is generated and registered (stored) in the suspended job database 1HJ as shown FIG. 10. The suspended job information 6HJ indicates a job ID for differentiating the job from other jobs, job data of the job, a user ID of a user account of a user who is a request source of the job and execution start conditions.

"Job data" are data including image data and processing conditions that are necessary for executing a suspended step of a job. As described above, when the suspended job information 6HJ is stored in the suspended job database 1HJ, processing for suspension is completed. In other words, a job reservation is completed.

Meanwhile, a case may arise in which the suspended job database 1HJ registers suspended job information 6HJ for another job that was reserved by a user who is about to reserve a job and still remains suspended. In such a case, when the user intends to execute the job to be reserved at the same time as the other job already registered, execution start conditions of the job to be reserved may be set to be the same as execution start conditions that are set for the other job. In contrast, when the user does not intend to execute both the jobs at the same time, the execution start conditions of the job to be reserved may be set to be different from the execution start conditions that are set for the other job.

Suppose that in the case where the suspended job database 1HJ is registered as shown in FIG. 10, for example, a user having a user account of the user ID "U005" is about to reserve a job. When the user intends to execute the job to be reserved at the same time as a job having the job ID "J005", the user may designate execution start conditions of the job to be reserved as "three times". When the user does not intend to execute both the jobs at the same time, the user may designate the number of times other than "three times".

Referring back to FIG. 4, the number of reads count portion 104 and the execution start job determining portion 105 perform processing for starting execution of a suspended job as described above. The processing is performed by the following procedures.

A user taps his/her user card 5 on the top surface ST of the IC card reader/writer 1RW only the number of times of execution start conditions that is designated before with respect to a suspended job that the user intends to execute. Every time the user taps the user card 5 once, the user is required to take the user card 5 away from the top surface ST by ten and a few centimeters in order to make the IC card reader/writer 1RW read a user ID more precisely.

Every time the user card 5 is tapped, the IC card reader/writer 1RW reads the user ID recorded on the user card 5 to transmit the user ID thus read to the image forming apparatus 1.

The number of reads count portion 104 counts the number of identical user IDs transmitted by the IC card reader/writer 1RW. In other words, the number of reads count portion 104 counts the number of times the user continually made the IC card reader/writer 1RW read the user ID of the user.

In the case, however, where the interval between the time a certain user ID is transmitted and the time the user ID is transmitted again is long, e.g., a couple of minutes or more, it is hard to say that the user made the IC card reader/writer 1RW read the user ID continually. In contrast, when the interval is excessively short, although the user intended to tap the user card 5 only once, the IC card reader/writer 1RW possibly read the user ID plural times against the user's will.

The number of reads count portion 104 counts incoming user IDs that are transmitted at predetermined intervals in order to count user IDs that a user continually made the IC card reader/writer 1RW read more precisely. In this embodiment, user IDs shall be counted that are transmitted at intervals ranging from Time T1 or more to Time T2 or less, where Time T1<Time T2. Accordingly, in the case where the interval between the time a user ID is transmitted and the time the same user ID is transmitted again is below the value of the Time T1, the latter user ID is not counted. Further, when the Time T2 has elapsed since a user ID was transmitted and the same user ID is not transmitted again, the count processing is finished. In short, a user is required to tap his/her user card 5 once every interval ranging from the Time T1 to the Time T2.

The Time T1 and the Time T2 can be set arbitrarily depending on environment where the image forming apparatus 1 is used and others. For example, when the image forming apparatus 1 is used under environment where many users are familiar with operation of OA (Office Automation) equipment, the Time T1 may be set to a fraction of a second and the Time T2 may be set to approximately one second. When the image forming apparatus 1 is used under environment where many users are unfamiliar with operation of OA equipment, the Time T1 may be set to approximately one second and the Time T2 may be set to approximately ten seconds.

The number of reads count portion 104 performs control processing in a manner to beep from a speaker 10m on a count basis in order to inform a user that a user ID is counted. Alternatively, the number of reads count portion 104 performs control processing in a manner to display a message indicating that a user ID is counted on the display portion TD of the control panel 10f. It is also possible that the number of counts at the present moment is output to the speaker 10m or the display portion TD.

As described above, when the Time T2 has elapsed since a user ID was transmitted last time and the same user ID is not transmitted again, the number of reads count portion 104 finishes the count processing with respect to the user ID. Then, the number of reads count portion 104 notifies the execution start job determining portion 105 of the count result.

After receiving the notification, the execution start job determining portion 105 determines a suspended job that a user requests to start based on the count result and others in the following manner. First, the execution start job determining portion 105 searches from the suspended job database 1HJ suspended job information 6HJ specifying the user ID that has been read this time by the IC card reader/writer 1RW. Then, the execution start job determining portion 105 selects, of the suspended job information 6HJ thus searched, one having the same number indicated in the execution start conditions as the count by the number of reads count portion 104. The execution start job determining portion 105 determines a job pertaining to the suspended job information 6HJ thus selected to be a job that the user requests to start.

Then, the job execution control portion 106 is requested to start execution of the job based on job data included in the suspended job information 6HJ selected by the execution start job determining portion 105. The job execution control portion 106 controls each portion so that the suspended job is executed. In the case where the job was executed partly and the remaining steps of the job are suspended, the job execution control portion 106 controls each portion so that only the remaining steps are started to be executed. The processing that was already executed is not executed again.

Figure 11:
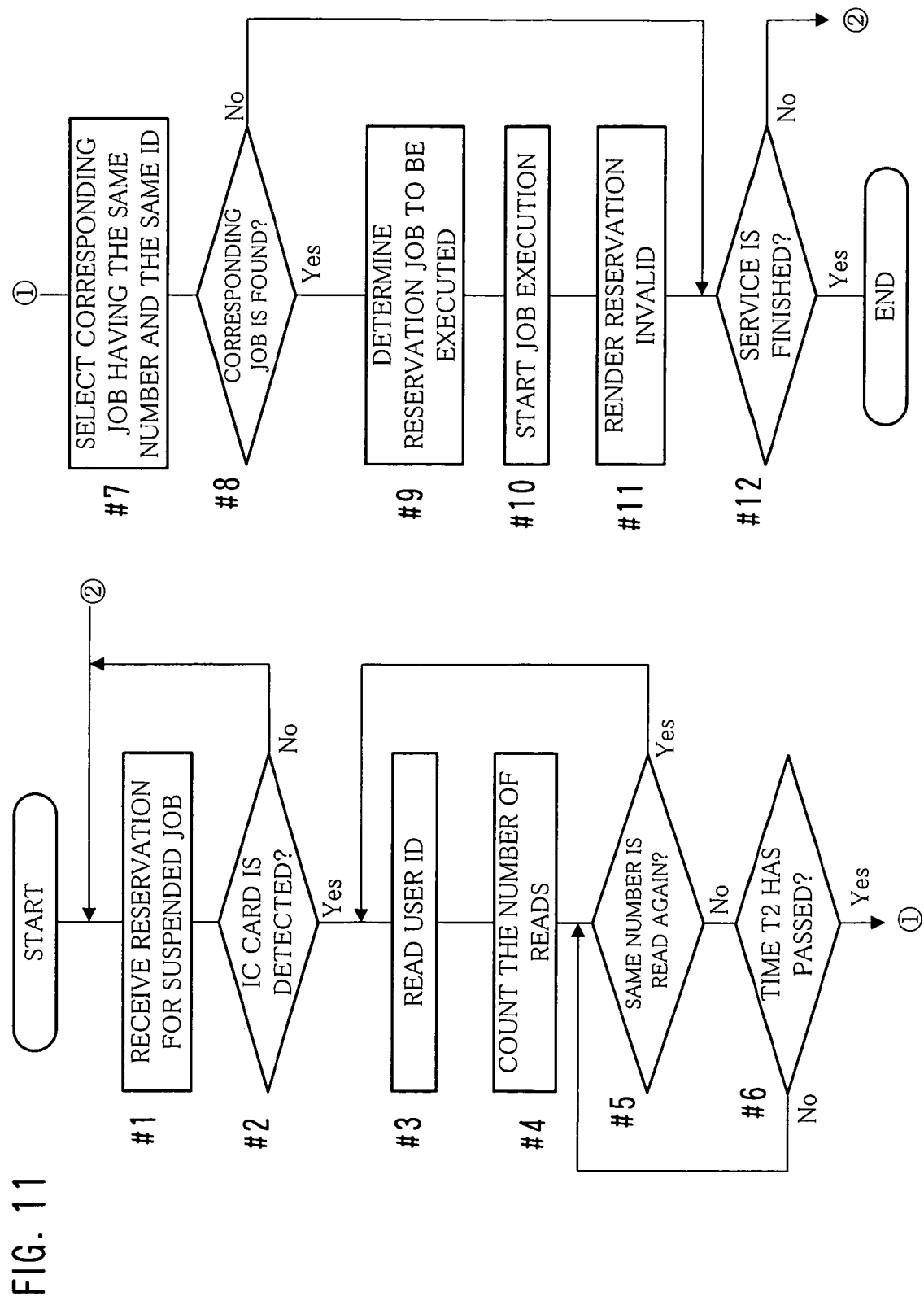
FIG. 11 is a flowchart showing an example of a flow of the entire processing in the image forming apparatus according to the first embodiment.

FIG. 11 is a flowchart showing an example of a flow of the entire processing in the image forming apparatus 1 according to the first embodiment.

Here, descriptions are provided, with reference to the flowchart, of a processing flow of the image forming apparatus 1 in dealing with a job whose execution is suspended. It should be noted that the CPU 10a executes programs stored on the hard disk drive 10d and others, thereby to realize processing of flowcharts shown in FIG. 11 and other drawings described later.

A user can operate the control panel 10f or the terminal 2 to register in the image forming apparatus 1 a job that is to be suspended temporarily instead of being finished now. In such a case, the user selects the "SUSPEND" button in pictures used for setting job execution conditions (see FIGS. 6, 7 and 8) to specify execution start conditions in the execution start conditions designation picture HG13 or the execution start conditions designation dialog box HG22 (see FIG. 9).

Responding to this, the image forming apparatus 1 generates suspended job information 6HJ of the job, i.e., the job for which execution is suspended, to store the suspended job information 6HJ in the suspended job database 1HJ (see FIG. 10) (Step #1 in FIG. 11). Note that a partial step of a job, e.g., an original scan step of a copy job or a fax transmission job, may be executed instead of being suspended.

When intending to start executing the suspended job, the user taps his/her user card 5 on the top surface ST of the IC card reader/writer 1RW the number of times indicated in the execution start conditions of the job.

Every time the user card 5 is tapped once, the IC card reader/writer 1RW detects the user card 5 and reads a user ID recorded on the user card 5, then to transmit the user ID to the image forming apparatus 1 (Yes in Step #2, Step #3 and Yes in Step #5). The image forming apparatus 1 counts the number of times the user ID is transmitted by the IC card reader/writer 1RW (Step #4). Stated differently, the image forming apparatus 1 counts the number of reads of the user ID by the IC card reader/writer 1RW.

When the Time T2 has elapsed since a user ID was read last time and the same user ID is not transmitted again, i.e., the same user ID is not read by the IC card reader/writer 1RW (Yes in Step #6), the image forming apparatus 1 searches from the suspended job database 1HJ suspended job information 6HJ indicating the user ID to select one having the same number indicated in execution start conditions as the count in Step #4 (Step #7). For example, when the user card 5 on which the user ID "U002" is recorded is tapped twice, suspended job information 6HJ indicating the job ID "J006" is selected (see FIG. 10).

After selecting the suspended job information 6HJ (Yes in Step #8), the image forming apparatus 1 determines that, with respect to a job pertaining to the suspended job information 6HJ, suspension should be cancelled and execution should be started (Step #9). Then, job data and others included in the suspended job information 6HJ are used to start execution of the job (Step #10). After completing the job execution, the suspended job information 6HJ is deleted from the suspended job database 1HJ or other operation is performed to render the suspended job information 6HJ invalid (Step #11).

In contrast, when such suspended job information 6HJ cannot be selected (No in Step #8), none of the suspended jobs are started to be executed. The processing of Steps #1 through #11 is appropriately executed if necessary while the image forming apparatus 1 is running.

In this embodiment, a user can easily make the image forming apparatus 1 execute a job that he/she reserved simply by letting the IC card reader/writer 1RW read a user ID recorded on his/her user card 5 predetermined number of times. In addition, since an IC card is adopted as the user card 5, it is possible to let the IC card reader/writer 1RW read the user card 5 more quickly compared to the case where a card on which a bar code is printed or a magnetic card is used.

While a user designates conditions for starting job execution (execution start conditions) in this embodiment, a configuration is possible in which the image forming apparatus 1 determines execution start conditions to inform a user of the same.

When a user only logs in to the image forming apparatus 1, the user lets the IC card reader/writer 1RW read a user ID only once. Accordingly, it is desirable that the number indicated in execution start conditions of a job is twice or more in order to distinguish between a login operation and a job execution start operation.

A case may arise in which when a user made the IC card reader/writer 1RW read his/her user ID wrong number of times, a job that is not expected by the user is executed. In order to avoid such a situation, the "OK" button or the "RESET" button may be displayed in the control panel 10f. Then, after a user ID is read correct number of times, the user is requested to select the "OK" button. When the "OK" button is pressed, job execution may be started. If the "RESET" button is pressed, the number of reads up to the present is reset.

Second Embodiment

Figure 12:
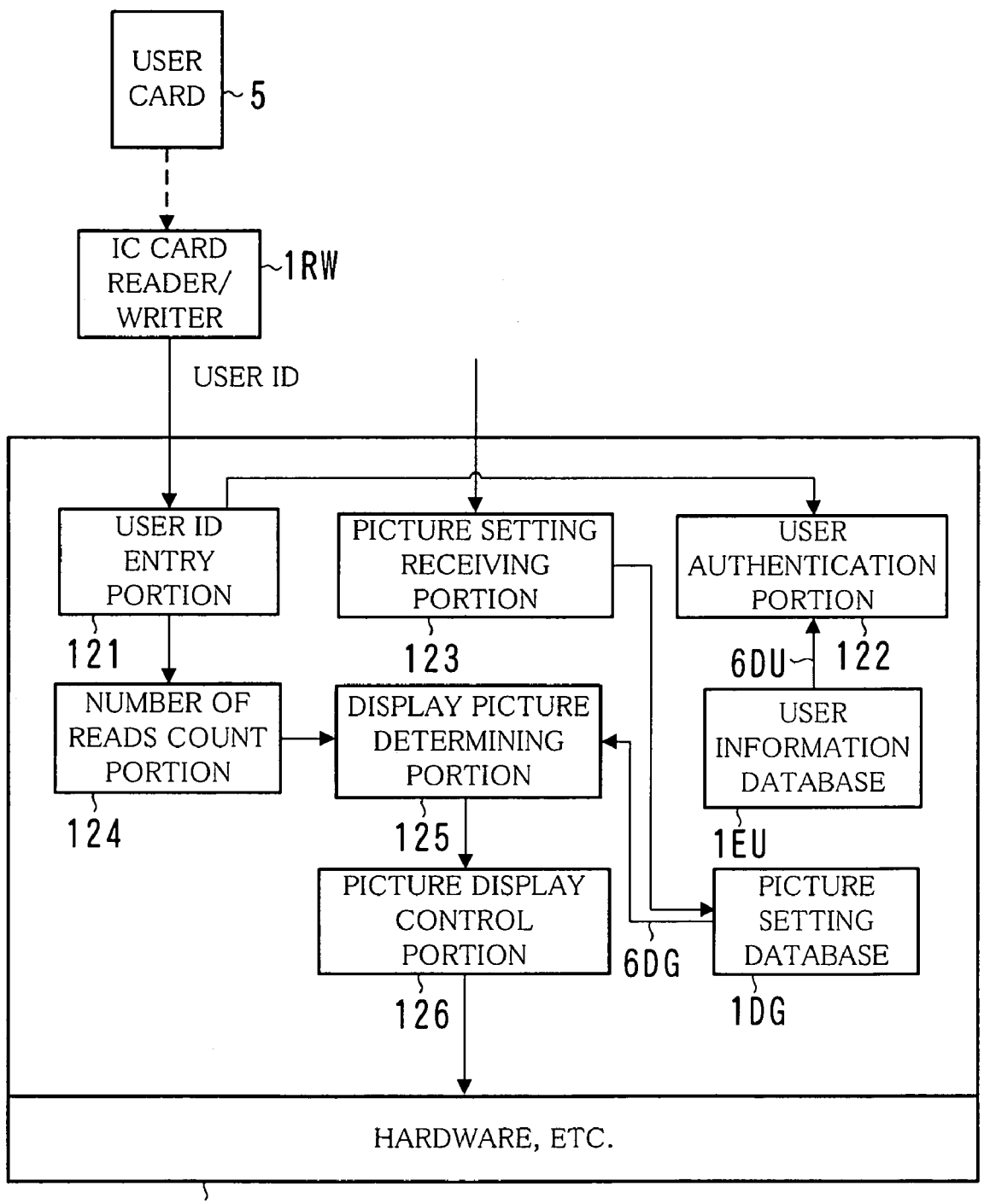
FIG. 12 is a diagram showing an example of a functional configuration of an image forming apparatus according to a second embodiment.
Figure 13:
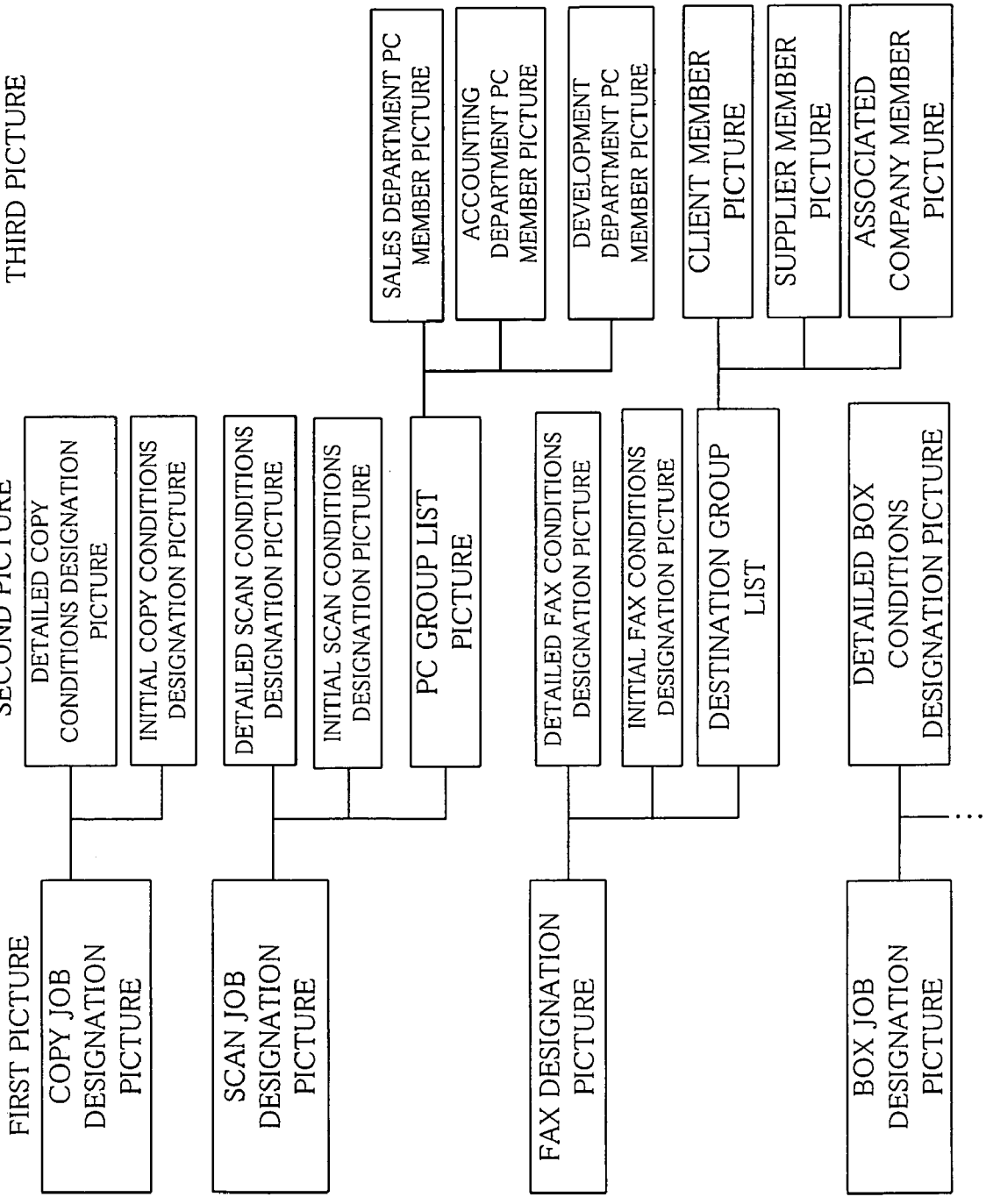
FIG. 13 shows an example of the relationship among pictures that can be displayed in the image forming apparatus.
Figure 15:
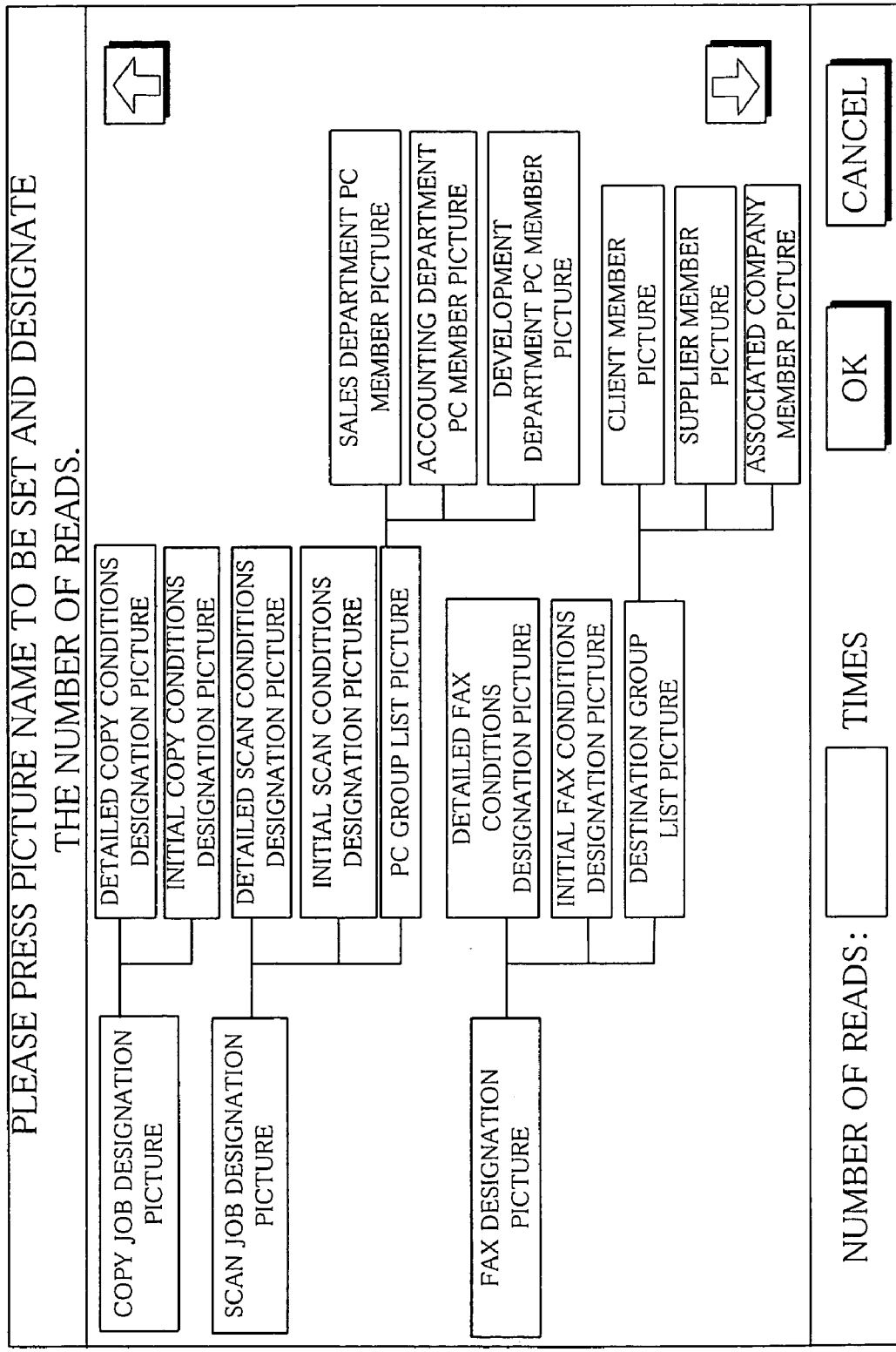
FIG. 15 shows an example of a display setting picture.

FIG. 12 is a diagram showing an example of a functional configuration of an image forming apparatus 1 according to the second embodiment, FIG. 13 shows an example of the relationship among pictures that can be displayed in the image forming apparatus 1, FIG. 14 shows an example of a picture setting database 1DG and FIG. 15 shows an example of a display setting picture HG31.

In the first embodiment, a user makes the IC card reader/writer 1RW read his/her user ID recorded on a user card 5 predetermined number of times to start (resume) execution of a suspended job. In the second embodiment, a user ID is read predetermined number of times, and thereby a picture desired by a user can be displayed in the control panel 10f.

A hardware configuration of the image forming apparatus 1 according to the second embodiment is basically the same as in the first embodiment shown in FIG. 2. Installed on the hard disk drive 10d, however, are programs and data for realizing functions of a user ID entry portion 121, a user authentication portion 122, a picture setting receiving portion 123, a number of reads count portion 124, a display picture determining portion 125, a picture display control portion 126, a user information database 1EU and a picture setting database 1DG.

In image forming apparatuses, main pictures are generally prepared for respective job types such as a copy job and a scan job. A user can use a main picture (a first picture) to roughly designate processing contents of a job. When intending to designate detailed processing contents, the user can press a predetermined button or others in a main picture to display a subpicture (a second picture). When intending to designate further detailed processing contents, the user can display a subpicture (a third picture) for the second picture. The user can press predetermined buttons or others to switch from the third picture to the second picture, then to switch from the second picture to the first picture. In short, pictures prepared in the image forming apparatuses form a hierarchy structure (tree structure) as shown in FIG. 13. The user can trace the hierarchy structure to switch to his/her desired picture.

In conventional cases, however, when the image forming apparatus has a wide variety of pictures, or when the hierarchy structure is deep, it is troublesome for a user to switch pictures. Suppose that, for example, pictures prepared in an image forming apparatus form the hierarchy structure as shown in FIG. 13. When a user intends to display a list picture of associated company facsimile numbers (an "associated company member picture" in the drawing) from a state where a copy job designation picture is displayed, the user has to trace the hierarchy structure to switch the pictures in the order of (1) a facsimile designation picture, (2) a destination group list picture and (3) the associated company member picture.

However, thanks to processing performed by the portions shown in FIG. 12 according to the second embodiment, a user can easily switch from a certain picture to user's desired picture using the user card 5. Hereinafter, processing contents of the portions shown in FIG. 12 and others are described with the focus on points different from the first embodiment. Descriptions will be omitted with respect to similarities to the first embodiment.

The user information database 1EU stores user information 6DU for each user who uses the image forming apparatus 1 similarly to the case of the user information database 1DU according to the first embodiment (see FIGS. 4 and 5).

The user ID entry portion 121 and the user authentication portion 122 perform the same processing as the user ID entry portion 101 and the user authentication portion 102 in the first embodiment respectively. More specifically, the user ID entry portion 121 performs processing for entering a user ID that is read from a user card 5 by the IC card reader/writer 1RW. The user authentication portion 122 performs user authentication of a user who is about to operate the image forming apparatus 1 based on the entered user ID.

The picture setting receiving portion 123 performs processing for receiving setting contents used for displaying a predetermined picture when a user ID is read from a user card 5. Such processing is performed, for example, in the following manner.

After logging in to the image forming apparatus 1, a user traces a hierarchy structure as in conventional cases to display a picture to be set. Then, the user performs a predetermined operation, e.g., presses the "SET" button, and designates the number of reads of the user ID necessary for displaying the picture. In short, the user designates conditions of the number of reads. For the designation, the user can use a numeric keypad to enter the number of reads. Alternatively, the user can tap the user card 5 the corresponding number of times for the designation.

Responding to this, the picture setting receiving portion 123 generates picture setting information 6DG anew to register (store) the same in the picture setting database 1DG as shown in FIG. 14. The picture setting information 6DG includes a user ID of a user account of a user who designated the conditions, identification information of a designated picture (a picture name, for example) and information indicative of designated number of reads.

A case may arise, however, in which picture setting information 6DG indicating the same user ID and the same number of reads as contents designated this time is present in the picture setting database 1DG. In such a case, the picture setting receiving portion 123 gives the user a message such as "the picture displayed using the number of reads is already registered" or others to invite the user to designate again the number of reads that is not set in any pictures by the user. Stated differently, the image forming apparatus is so configured that one user cannot designate the same number of reads for plural pictures.

Alternatively, the following configuration is also possible. After logging in to the image forming apparatus 1, a user performs a predetermined operation. Responding to this, the picture setting receiving portion 123 displays the display setting picture HG31 as shown in FIG. 15 on the display portion TD of the control panel 10f. The user selects (designates) from the display setting picture HG31 a name of a picture to be displayed by making the IC card reader/writer 1RW read a user ID of his/her user account. Further, the user designates in the field "number of reads" the number of reads of the user ID necessary for displaying the picture. For example, in the case where the user intends that the associated company member picture is displayed when the user ID is read three times, the user presses the area bearing the name associated company member picture to designate the same and enters "three" in the field "number of reads". Then, the user presses the "OK" button.

In response to this, the picture setting receiving portion 123 receives the contents specified in the display setting picture HG31. Then, the picture setting receiving portion 123 generates picture setting information 6DG anew to register (store) the same in the picture setting database 1DG as shown in FIG. 14.

Thus, the picture setting receiving portion 123 performs processing for receiving designation of processing contents concerning picture display. Information on the processing contents pertaining to the designation is memorized in the picture setting database 1DG.

The number of reads count portion 124 and the display picture determining portion 125 perform processing for determining a picture to be displayed on the display portion TD of the control panel 10f in accordance with the number of times the IC card reader/writer 1RW continually read a user ID from a user card 5. Such processing is performed in the following procedure.

A user makes the IC card reader/writer 1RW read a user ID recorded on his/her user card 5 one or more times. When the user ID is read plural times, the reading operation is performed once every predetermined interval (the interval ranging from Time T1 or more to Time T2 or less), similarly to the case of the first embodiment.

Responding to this, the number of reads count portion 124 counts the number of times the user made the IC card reader/writer 1RW read the user ID in a way similar to the number of reads count portion 104 according to the first embodiment. When the Time T2 has elapsed since the user ID was transmitted last time and the same user ID is not transmitted again, the number of reads count portion 124 finishes the count processing with respect to the user ID. Then, the number of reads count portion 124 notifies the display picture determining portion 125 of the count result.

The display picture determining portion 125 determines a picture to be displayed on the display portion TD depending on the count result by the number of reads count portion 124. More specifically, the display picture determining portion 125 searches from the picture setting database 1DG picture setting information 6DG indicating the same value as the user ID and the number of reads read by the number of reads count portion 124. Then, the display picture determining portion 125 determines a picture specified in the picture setting information 6DG thus searched to be the picture to be displayed.

For example, in the case where picture setting information 6DG is stored in the picture setting database 1DG as shown in FIG. 14, when the user ID "U002" is read three times, the display picture determining portion 125 determines to display the "associated company member picture".

The picture display control portion 126 controls the control panel 10f and others so that the picture determined by the display picture determining portion .125 is displayed on the display portion TD.

Figure 16:
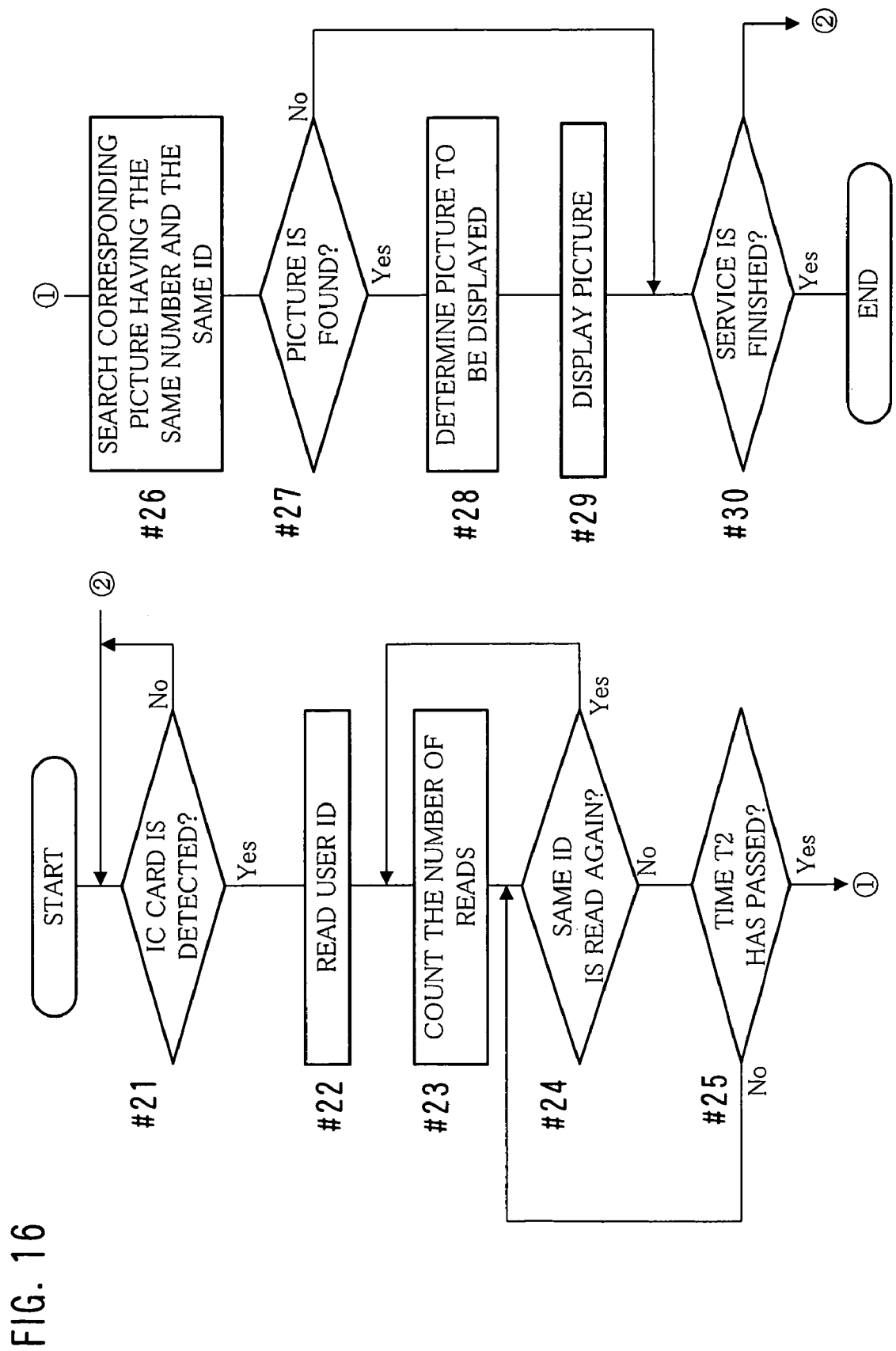
FIG. 16 is a flowchart showing an example of a flow of the entire processing in the image forming apparatus according to the second embodiment.

FIG. 16 is a flowchart showing an example of a flow of the entire processing in the image forming apparatus 1 according to the second embodiment.

Here, descriptions are provided, with reference to the flowchart, of a processing flow of the image forming apparatus 1 at the time of displaying a picture in accordance with the number of reads of a user ID.

A user who has logged in to the image forming apparatus 1 can trace a hierarchy structure to display his/her desired picture on the display portion TD of the control panel 10f as in conventional ways. Alternatively, the user can display the same by tapping his/her user card 5 on the IC card reader/writer 1RW the number of times corresponding to the desired picture to make the IC card reader/writer 1RW read the user ID.

Every time the IC card reader/writer 1RW detects the user card 5, it reads the user ID from the user card 5. The image forming apparatus 1 counts the number of reads (Yes in Step #21, Steps #22 and #23 and Yes in Step #24 in FIG. 16).

When the Time T2 has elapsed since the user ID was read last time and the same user ID is not transmitted again, i.e., when the same user ID is not read by the IC card reader/writer 1RW (Yes in Step #25), the image forming apparatus 1 searches from the picture setting database 1DG picture setting information 6DG indicating both the user ID and the number of reads that is counted this time (Step #26).

When such picture setting information 6DG is found (Yes in Step #27), the image forming apparatus 1 determines a picture indicated in the picture setting information 6DG to be a picture to be displayed (Step #28) to switch the picture that is currently displayed on the display portion TD to the picture thus determined (Step #29).

In contrast, when such picture setting information 6DG is not found (No in Step #27), the display portion TD displays the current picture continuously. On this occasion, it is possible to deliver to the user a message indicating that there is no picture corresponding to the number of reads. The processing of Steps # 21 through # 29 is appropriately executed if necessary when the image forming apparatus 1 is running.

In this embodiment, a user can easily display his/her often-used picture on the control panel 10f by simply letting the IC card reader/writer 1RW read a user ID recorded on his/her user card 5 at predetermined number of times.

A configuration is possible in which a user can change the picture setting information 6DG registered on the picture setting database 1DG (see FIG. 14). For example, a configuration is possible in which a user can change the number of reads as display conditions. Further, it is also possible that picture setting information 6DG of a picture that is not frequently used can be deleted from the picture setting database 1DG.

In this embodiment, descriptions are provided of a case in which the present invention applies to image forming apparatuses such as MFPs. In many cases, control panels of image forming apparatuses cannot generally display plural pictures at the same time. For this reason, users cannot set the same number of reads in display conditions for plural pictures as described earlier. In the case, however, where the present invention applies to personal computers or workstations on which multiwindow supporting OS, e.g., Windows (Registered Trademark), Mac OS or SOLARIS is installed, it may be accepted that the same number of reads is set in display conditions for plural pictures. When such setting is performed, the pictures may be displayed one above the other or side-by-side.

Third Embodiment

Figure 17:
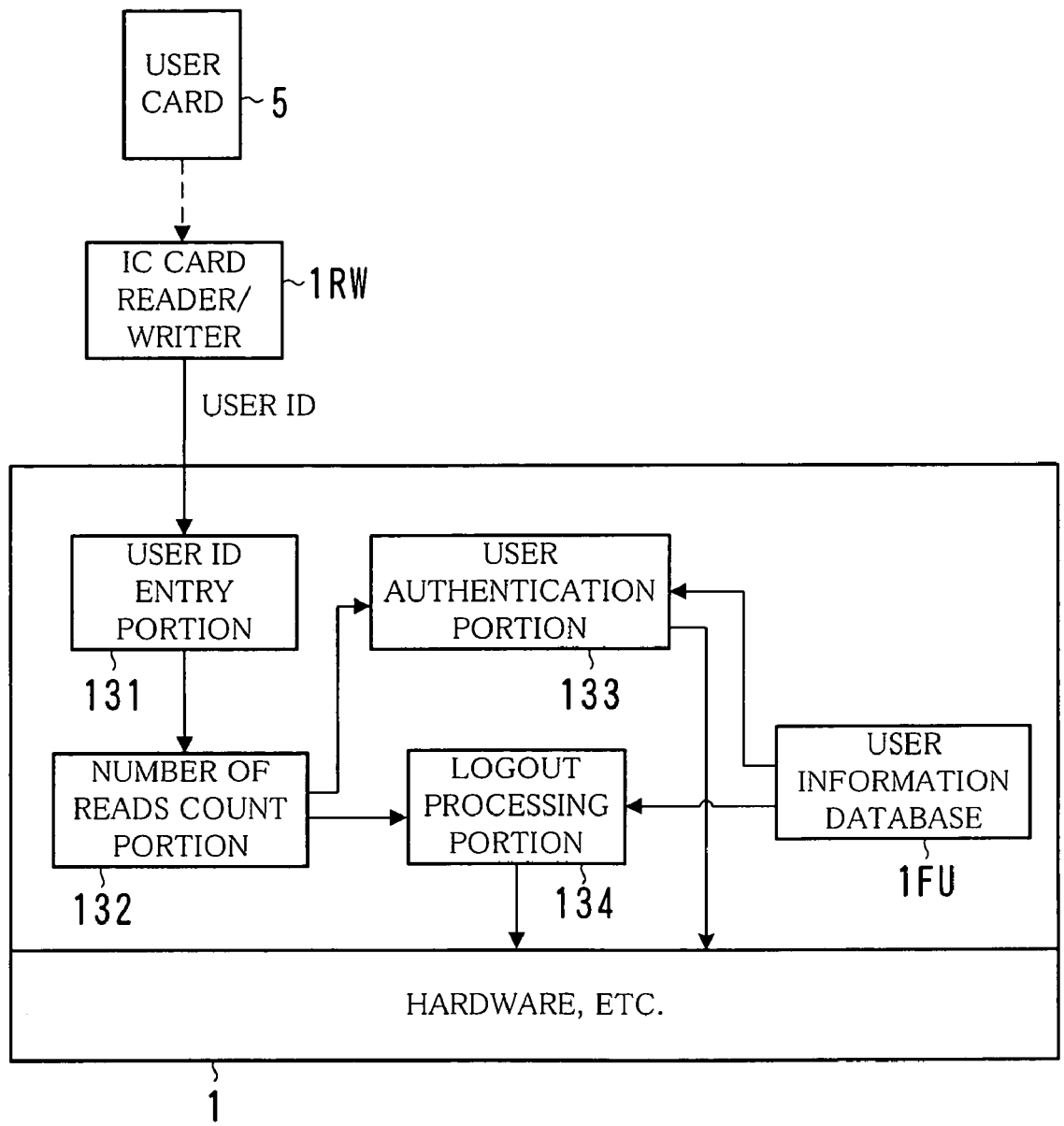
FIG. 17 is a diagram showing an example of a functional configuration of an image forming apparatus according to a third embodiment.

FIG. 17 is a diagram showing an example of a functional configuration of an image forming apparatus 1 according to the third embodiment and FIG. 18 shows an example of a user information database 1FU.

In the first embodiment, execution of a suspended job is started in accordance with the number of reads of a user ID. In the second embodiment, pictures to be displayed on the display portion TD of the control panel 10f are switched. In the third embodiment, a reading operation of a user ID plural times is used for security measures.

A hardware configuration of the image forming apparatus 1 according to the third embodiment is basically the same as in the first embodiment shown in FIG. 2. Installed on the hard disk drive 10d, however, are programs and data for realizing functions of a user ID entry portion 131, a number of reads count portion 132, a user authentication portion 133, a logout processing portion 134, a user information database 1FU and others.

Hereinafter, processing contents of the portions shown in FIG. 17 and others are described with the focus on parts different from the first embodiment. Descriptions will be omitted with respect to similarities to the first embodiment.

The user information database 1FU stores information indicating that login processing or logout processing should be executed responding to which user ID is read and how many times the user ID is read. More specifically, referring to FIG. 18, the user information database 1FU stores user information 6FU for each user who uses the image forming apparatus 1. The user information 6FU indicates various types of information on a user including a user ID of a user account, a name and a password of the user and a name of a department to which the user belongs (a department name) and a department ID similarly to the case of the user information 6DU according to the first embodiment (see FIGS. 4 and 5).

The user information 6FU further indicates the number of times a user is required to make the IC card reader/writer 1RW read a user ID at the time of logging in (hereinafter referred to as "necessary number of reads in logging in Sm" or "number of reads Sm"), the number of times a user is required to make the IC card reader/writer 1RW read a user ID at the time of logging out (hereinafter referred to as "necessary number of reads in logging out Sn" or "number of reads Sn") and a lock flag RFG. Both the number of reads Sm and the number of reads Sn are disclosed only to the user himself/herself. The user has to pay attention not to disclose them to other people.

The lock flag RFG indicates whether or not the corresponding user account is locked. The number "1" indicates that the corresponding user account is locked while the number "0" indicates that it is not locked. A user account that is locked cannot be used until the lock is released.

The user ID entry portion 131 and the number of reads count portion 132 perform the same processing as the user ID entry portion 101 and the number of reads count portion 104 according to the first embodiment respectively. More specifically, the user ID entry portion 131 performs processing for entering a user ID that is read from a user card 5 by the IC card reader/writer 1RW. The number of reads count portion 132 counts the number of times the IC card reader/writer 1RW read the user ID from the user card 5 continually.

The user authentication portion 133 performs processing for verifying the authenticity of a user who is about to use the image forming apparatus 1, i.e., user authentication. It is necessary to satisfy the following three requirements in order to verify the authenticity.

Requirement 1: A user ID that is read from a user card 5 by the IC card reader/writer 1RW is specified in any of user information 6FU stored in the user information database 1FU. This is similar to the case of the first embodiment.

Requirement 2: The user ID is continuously read by the IC card reader/writer 1RW the number of reads Sm indicated in the user information 6FU.

Requirement 3: A user account relating to the user ID is not locked.

The logout processing portion 134 performs processing when a user currently logging in to the image forming apparatus 1 finishes using the same to log out from the same. With conventional image forming apparatuses, when a predetermined command is merely entered, logging out of the corresponding user is accepted. In contrast, according to the present embodiment, it is necessary for a user who is about to logout to make the IC card reader/writer 1RW read a user ID recorded on his/her user card 5 the number of reads Sn indicated in user information 6FU of his/her user account. When the number of reads is below the number of reads Sn or above the number of reads Sn, the logout processing portion 134 performs logout processing. In such a case, however, a user who performed the operation is regarded as an unauthorized user and the user account of the user is locked for security. More specifically, a lock flag RFG of the user information 6FU of the user is updated to "1".

Figure 19:
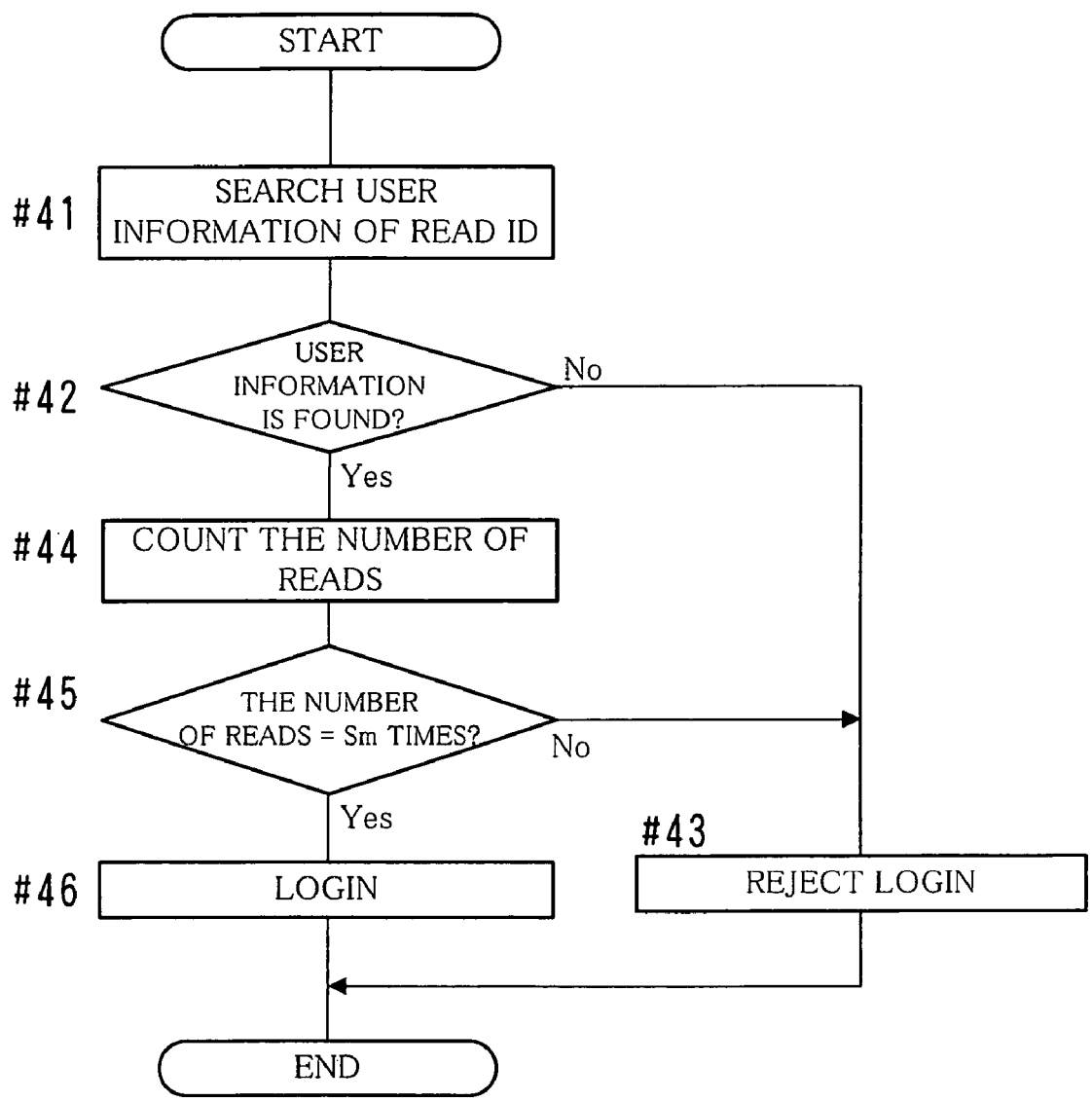
FIG. 19 is a flowchart showing an example of a flow of user authentication processing according to the third embodiment.
Figure 20:
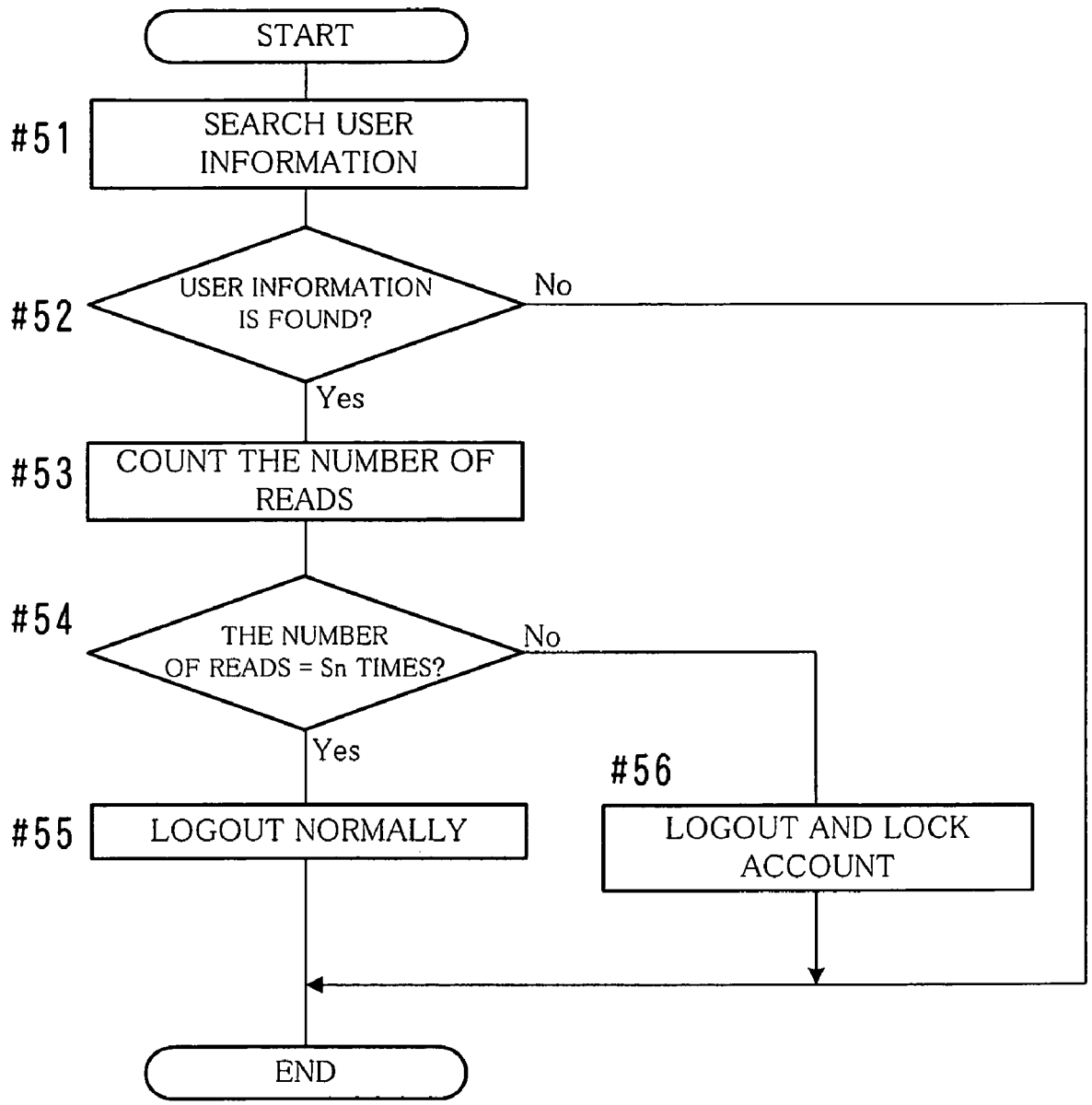
FIG. 20 is a flowchart showing an example of a flow of logout processing according to the third embodiment.

FIG. 19 is a flowchart showing an example of a flow of user authentication processing according to the third embodiment and FIG. 20 is a flowchart showing an example of a flow of logout processing according to the third embodiment.

Next, descriptions will be provided, with reference to the flowcharts, of flows of processing at the time of user authentication and a logout operation by the image forming apparatus 1 according to this embodiment.

A user who intends to login to the image forming apparatus 1 performs an operation for making the IC card reader/writer 1RW read a user ID recorded on his/her user card 5 the number of reads Sm indicated in his/her user information 6FU.

Responding to this, the image forming apparatus 1 searches from the user information database 1FU user information 6FU corresponding to the user ID read by the IC card reader/writer 1RW (#41 in FIG. 19). If such user information 6FU is not found (No in #42), the image forming apparatus 1 determines that the user is not an authorized user and rejects the login attempt (#43).

If such user information 6FU is found (Yes in #42), the image forming apparatus 1 counts the number of times the IC card reader/writer 1RW read the user ID (#44). When the number of times is the same as the number of reads Sm of the user information 6FU (Yes in #45), the image forming apparatus 1 verifies the authenticity of the user, then to allow the user to login thereto (#46). After that, the user is allowed to use the image forming apparatus 1 until he/she logs out. In contrast, when they are not the same (No in #45), the image forming apparatus 1 determines that the user is not an authorized user, then to reject the login thereto (#43).

When the user intends to log out from the image forming apparatus 1, he/she performs an operation for making the IC card reader/writer 1RW read the user ID recorded on his/her user card 5 the number of reads Sn indicated in his/her user information 6FU.

Responding to this, the image forming apparatus 1 searches from the user information database 1FU user information 6FU corresponding to the user ID read by the IC card reader/writer 1RW (#51 in FIG. 20). If such user information 6FU is not found (No in #52), the image forming apparatus 1 stops the logout processing.

If such user information 6FU is found (Yes in #52), the image forming apparatus 1 counts the number of times the IC card reader/writer 1RW read the user ID (#53). When the number of times is the same as the number of reads Sn of the user information 6FU (Yes in #54), the image forming apparatus 1 allows the user to log out therefrom as usual (#55).

In contrast, when they are not the same (No in #54), the image forming apparatus 1 performs the logout processing and updates the lock flag RFG of the user information 6FU to "1", then to lock the user account (#56). Hereafter, the locked user account cannot be used. In order to have the locked user account available again, the user who is an owner of the user account has to ask an administrator to unlock the user account. When the administrator decides that the user is allowed to use the user account, an operation is performed for updating the lock flag RFG of the user account to "0".

In this embodiment, it is necessary for a user to make the IC card reader/writer 1RW read a user card 5 the number of times continuously that is known only to the user. It is insufficient for the user to only make the IC card reader/writer 1RW read the user card 5 as in conventional cases. This embodiment can ensure that fraudulent use of a user card 5 by others is prevented even if the user card 5 is lost or stolen.

Although the number of reads Sm may be equal to the number of reads Sn, it is desirable that they are different from each other for focusing on the security. A configuration may be adopted in which when a login operation fails (No in Step #45 in FIG. 19), a user account by which the login operation is attempted is locked.

Fourth Embodiment

Figure 21:
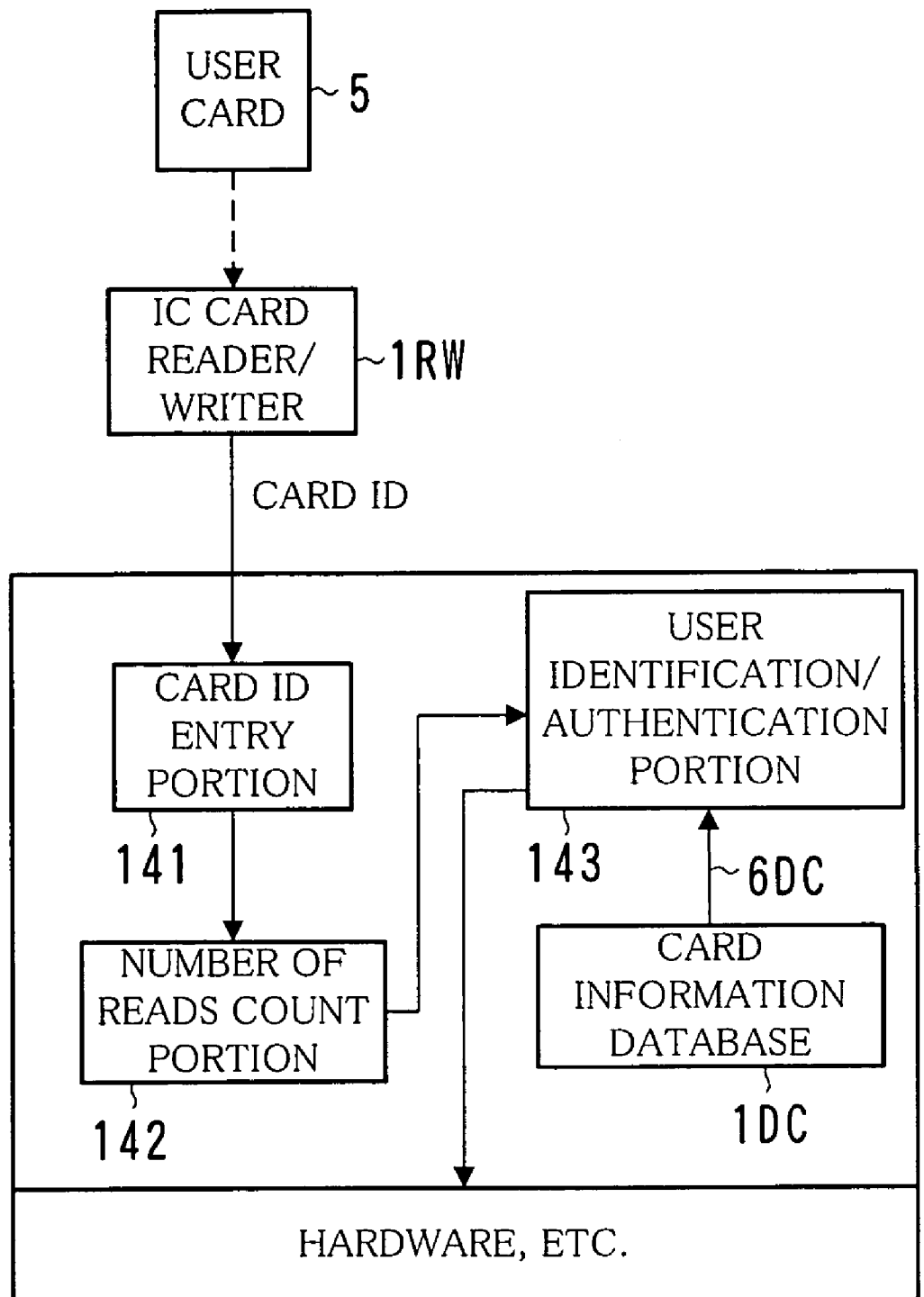
FIG. 21 is a diagram showing an example of a functional configuration of an image forming apparatus according to a fourth embodiment.

FIG. 21 is a diagram showing an example of a functional configuration of an image forming apparatus 1 according to the fourth embodiment and FIG. 22 shows an example of a card information database 1DC.

In the first to third embodiments, depending on the number of reads of a user ID, a suspended job is executed, pictures are switched and login/logout processing is performed. In the fourth embodiment, one user card 5 is shared by plural users.

A hardware configuration of the image forming apparatus 1 according to the fourth embodiment is basically the same as in the first embodiment shown in FIG. 2. However, installed on the hard disk drive 10d are programs and data for realizing functions of a card ID entry portion 141, a number of reads count portion 142, a user identification/authentication portion 143, the card information database 1DC and others.

In the first embodiment, a user ID is recorded on a user card 5. According to the fourth embodiment, instead of a user ID, a card ID for distinguishing the corresponding user card 5 from other user cards 5 is recorded on the user card 5

Descriptions are given of processing contents of the portions shown in FIG. 21 with the focus on points different from in the first embodiment. Descriptions of points that are shared with the first embodiment are omitted.

The card information database 1DC stores information as to which of the user accounts is processed for login responding to which card ID is read and how many times the card ID is read. More specifically, as shown in FIG. 22, the card information database 1DC stores card information 6DC for each user card 5. The card information 6DC indicates user IDs for respective user accounts of users who share the card. In addition, necessary number of reads in logging in Sp (hereinafter referred to as "number of reads Sp") is associated with each of the user IDs. It is necessary to set number of reads Sp corresponding to each user ID specified in one piece of card information 6DC in a manner to avoid overlap with one another.

The IC card reader/writer 1RW reads a card ID from a user card 5 of a user who is about to login to the image forming apparatus 1, then to transmit the card ID thus read to the image forming apparatus 1. The card ID entry portion 141 performs processing for entering the card ID from the IC card reader/writer 1RW.

The number of reads count portion 142 and the user identification/authentication portion 143 perform user authentication processing for a user who is about to login to the image forming apparatus 1. The processing is performed in the following procedures.

A user taps his/her user card 5 shared by other users on the top surface ST of the IC card reader/writer 1RW. Here, the number of tapping times is number of reads Sp that is set for a user account of the user himself/herself. Further, similarly to the case of the first embodiment and others, in order to certainly tap once, attention should be paid so that the user card 5 is ten and a few centimeters away from the top surface ST every time the user taps the user card 5 once, and a predetermined interval (Time T1 or more and Time T2 or less) is provided until the user taps the user card 5 next time.

Every time the user card 5 is tapped, the IC card reader/writer 1RW reads a card ID recorded on the user card 5, then to transmit the card ID thus read to the image forming apparatus 1.

The number of reads count portion 142 counts the number of times the card ID is transmitted from the IC card reader/writer 1RW. When the Time T2 has elapsed since the card ID was transmitted last time and the same card ID is not transmitted again, the number of reads count portion 142 finishes the count processing with respect to the card ID. Then, the number of reads count portion 142 notifies the user identification/authentication portion 143 of the count result.

The user identification/authentication portion 143 searches from the card information database 1DC card information 6DC indicating the card ID that has been read this time by the IC card reader/writer 1RW. Of the card information 6DC, the user identification/authentication portion 143 searches for a user ID having the same number of reads Sp as the count result by the number of reads count portion 142, i.e., as the number of reads this time and determines that a user account relating to the user ID thus searched is a user account of the user. Then, the user identification/authentication portion 143 allows the user to login to the image forming apparatus 1 using the user account.

Figure 23:
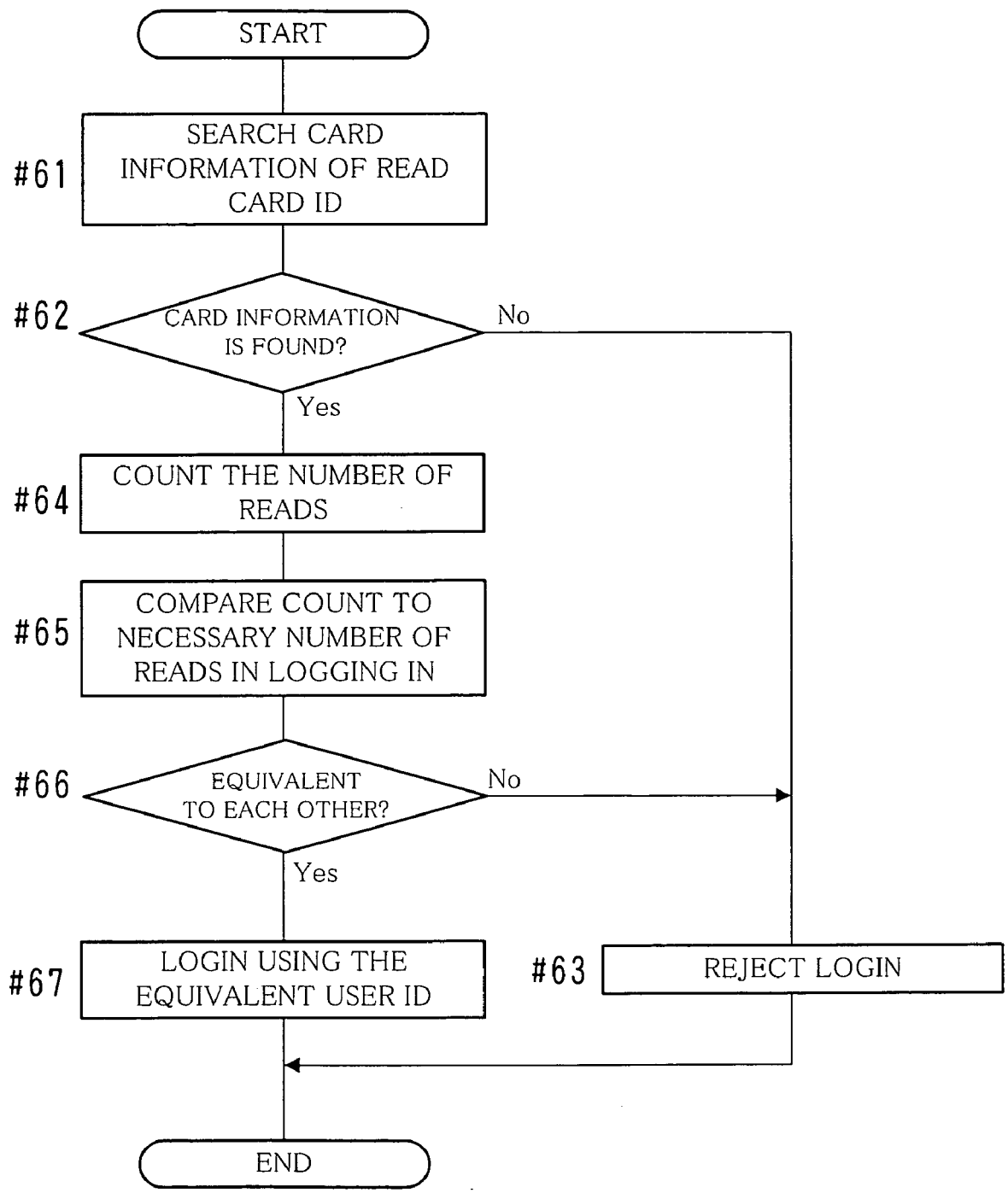
FIG. 23 is a flowchart showing an example of a flow of the entire processing in the image forming apparatus according to the fourth embodiment.

FIG. 23 is a flowchart showing an example of a flow of the entire processing in the image forming apparatus according to the fourth embodiment.

Next, descriptions are provided, with reference to the flowchart, of a processing flow at the time of user authentication by the image forming apparatus 1 according to the fourth embodiment.

A user who intends to login to the image forming apparatus 1 performs an operation for making the IC card reader/writer 1RW read a card ID recorded on his/her user card 5 the number of reads Sp that is set for the user ID of his/her user account.

Responding to this, the image forming apparatus 1 searches from the card information database 1DC card information 6DC corresponding to the card ID read by the IC card reader/writer 1RW (#61 in FIG. 23). If such card information 6DC is not found (No in #62), the image forming apparatus 1 determines that the user is not an authorized user and rejects the login attempt (#63).

If such card information 6DC is found (Yes in #62), the image forming apparatus 1 counts the number of times the IC card reader/writer 1RW read the card ID (#64). The counted number is compared with each of the number of reads Sps indicated in the card information 6DC, and thereby, the number of reads Sp that is equal to the counted number is found (#65).

If the number of reads Sp that is equal to the counted number is found (Yes in #66), login processing using the user account of the corresponding user ID is performed (#67). For example, when the IC card reader/writer 1RW read the card ID "C003" five times, login processing using the user account having the user ID "U133" is performed. In contrast, if the number of reads Sp that is equal to the counted number is not found (No in #66), the image forming apparatus 1 rejects the login thereto (#63).

In this embodiment, one user card 5 can be easily shared by plural users. Further, one user having plural user accounts can selectively use, depending on the situation, a user account to be used for login without possessing plural user cards 5. Furthermore, a user can easily separate a user account for personal use and a user account used for a group to which the user belongs (a so-called group account).

In the first to the fourth embodiments, a case is described by way of example in which the present invention applies to the image forming apparatus 1. The present invention can apply to other processing equipment such as automobiles, electric appliances, CDs (Cash Dispensers) or ATMs (Automatic Teller Machines). When the present invention applies to, for example, an automobile, the following configuration may be adopted.

An IC card reader is provided in the automobile and a user card 5 is used as a key for the automobile. When a driver unlocks an automobile door or starts an engine, he/she taps the user card 5 on the IC card reader/writer to make it read a user ID. A computer mounted on the automobile (in-vehicle computer) executes processing for unlocking the automobile door or processing for starting the engine only when the user ID that was read by the IC card reader/writer is the same as a user ID registered on the in-vehicle computer and the number of reads is equal to the number of times as conditions registered on the in-vehicle computer. When the driver locks the automobile door, the driver makes the IC card reader/writer read the user ID predetermined number of times Sy. When the number of reads by the IC card reader/writer is not the same as the number of times as conditions registered on the in-vehicle computer, the in-vehicle computer judges that the automobile may be thieved. Then, the in-vehicle computer serves not to unlock the automobile door or not to start the engine even when the user card 5 is used the next time.

A configuration may be adopted in which, in accordance with the number of reads, a destination on a car navigation system is set to be a predetermined location, a car audio system or an air conditioner is changed to a predetermined set value or a door window is adjusted to a predetermined position.

Instead of using an IC card as the user card 5, it is possible to use a cellular phone unit that contains an IC chip therein or has a wireless communication function such as Bluetooth.

Furthermore, the configuration of the entire or a part of the image processing system 1, the processing contents, the processing procedure, the configuration of the databases and the like can be modified in accordance with the spirit of the present invention if necessary.

The present invention can be suitably used for processing apparatuses having multiple functions or processing apparatuses used by users who are unfamiliar with the operation.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A processing apparatus, comprising:
    an interface that connects to a reading device that reads information from a portable storage medium;
    a memory device that stores in a table one or more processing contents in association with a number of times that predetermined information is to be read from the portable storage medium at predetermined intervals of time;
    a counter that counts a number of reads of the predetermined information recorded on the storage medium that a user continually makes the reading device read at the predetermined intervals of time; and
    a controller that performs control processing that includes starting execution of processing for the processing contents associated with the number of times stored in the memory device that correspond to the number of reads counted by the counter, wherein the number of times is used to recognize which of the stored processing contents is to be executed, and wherein the number of times and associated information for starting execution of processing are predefined within the table in the memory device.

2. The processing apparatus according to claim 1, wherein the storage medium is an IC card, and
    the reading device is an IC card reader.

3. The processing apparatus according to claim 1, further comprising a receiving portion that receives a designation of contents of processing desired by the user,
    wherein the memory device stores, as the processing contents, contents relating to the designation received by the receiving portion.

4. The processing apparatus according to claim 3, wherein the receiving portion receives a designation of the number of times that the predetermined information is to be read from the portable storage medium at the predetermined intervals of time as a condition for starting the execution of processing for the contents of the processing desired by the user, and
    the memory device stores the processing contents in association with the designated number of times that the predetermined information is to be read relating to the designation.

5. The processing apparatus according to claim 3, further comprising a printing device that prints an image on paper,
    wherein the designation of contents relates to print processing for printing an image on paper, and
    the controller performs control processing for the printing device that includes starting execution of the print processing for the processing contents associated with the number of times stored in the memory device that correspond to the number of reads counted by the counter.

6. The processing apparatus according to claim 3, further comprising a transmission device that transmits image data to an external device,
    wherein the designation of contents relates to transmission processing for transmitting image data to an external device, and
    the controller performs control processing for the transmission device that includes starting execution of the transmission processing for the processing contents associated with the number of times stored in the memory device that correspond to the number of reads counted by the counter.

7. The processing apparatus according to claim 1, further comprising a display device that displays, for the user, one or more operation pictures by which the user performs an operation, wherein the memory device stores, as the processing contents, information as to which of the operation pictures is displayed on the display device, and the controller performs control processing, based on the processing contents, for the display device that includes displaying the operation picture indicated in the processing contents associated with the number of times stored in the memory device that correspond to the number of reads counted by the counter.

8. The processing apparatus according to claim 1, wherein the memory device stores, as the processing contents, information as to which one of login processing or logout processing is to be executed for a predetermined account, and the controller performs control processing that includes executing the login processing for the predetermined account if the processing contents are information indicating that the login processing is to be executed, and executing the logout processing for the predetermined account if the processing contents are information indicating that the logout processing is to be executed, the processing contents associated with the number of times stored in the memory device that correspond to the number of reads counted by the counter.

9. The processing apparatus according to claim 1, wherein the storage medium is shared by plural accounts, the memory device stores, as the processing contents, information as to which of the accounts is processed for login to the processing apparatus, and the controller performs control processing that includes executing the login processing for the account indicated in the processing contents associated with the number of times stored in the memory device that correspond to the number of reads counted by the counter.

10. The processing apparatus according to claim 1, wherein the number of reads counted at the predetermined intervals of time includes only reads that are read at intervals ranging from time T1 to time T2, where T1<T2.

11. The processing apparatus according to claim 1, wherein the number of reads counted at the predetermined intervals of time includes reads that are read within a time period between time T1 and time T2, where T1<T2, from a previous read of the predetermined information by the reading device.

12. The processing apparatus according to claim 11, wherein the counter does not count in the number of reads any reads that are read within the time T1 from a previous read of the predetermined information by the reading device.

13. The processing apparatus according to claim 11, wherein the counter finishes counting the number of reads after time T2 elapses since a read of the predetermined information by the reading device.

14. A job execution apparatus connected to a reading device that reads information from a portable storage medium, the job execution apparatus comprising:

a receiving portion that receives a reservation for execution of a job together with processing contents in executing the job and a starting condition value that is a counting number used to recognize which job is to be executed, wherein the starting condition value and associated information for starting the execution of the job are predefined within a table;

a memory device that stores the processing contents in association with the starting condition value and the reservation received by the receiving portion;

a counter that counts a number of reads of predetermined information from the storage medium that the reading device continually reads at predetermined intervals of time; and a controller that performs control processing that includes starting execution of a job for the processing contents associated with the starting condition value stored in the memory device that is equal to the number of reads counted by the counter.

15. A job execution apparatus connected to a reading device that reads information from a portable storage medium, the job execution apparatus comprising:

a receiving portion that receives a reservation for execution of a job that is desired by a user together with processing contents in executing the job and a starting condition value that is a counting number used to recognize which job is to be executed, wherein the starting condition value and associated information for starting the execution of the job are predefined within a table;

a memory device that stores the processing contents in association with the reservation, the starting condition value relating to the reservation and a user ID of the user who is a source of the reservation;

a counter that counts a number of reads of the user ID recorded on the storage medium that are continually read by the reading device at predetermined intervals of time; and a controller that performs control processing that includes starting execution of a job for the processing contents associated with the user ID stored in the memory device that corresponds to the user ID that is read by the reading device, and associated with the starting condition value stored in the memory device that is equal to the number of reads counted by the counter.

16. A method for controlling a processing apparatus, the method comprising:

preparing a reading device connected to the processing apparatus, the reading device reading information from a portable storage medium;

making a memory device store processing contents of one or more processing that is to be executed by the processing apparatus, the processing contents being stored in a table in association with a number of times that predetermined information is to be read from the portable storage medium at predetermined intervals of time; and controlling the processing apparatus to count a number of reads of the predetermined information recorded on the storage medium that a user continually makes the reading device read at the predetermined intervals of time, and to start execution of processing for the processing contents associated with the number of times stored in the memory device that correspond to the number of reads counted, wherein the number of times is used to recognize which of the stored processing contents is to be executed, and wherein the number of times and associated information for starting execution of processing are predefined within the table in the memory device.

17. A computer-readable storage medium storing a computer program for use in a computer that controls a processing apparatus connected to a reading device that reads information from a portable storage medium, the computer program making the computer execute the processing comprising the steps of:

counting a number of reads of predetermined information recorded on the storage medium that a user continually makes the reading device read at predetermined intervals of time;

calling processing contents associated with a number of times stored in a table in a memory device that correspond to the number of reads of the predetermined information counted; and controlling the processing apparatus including starting execution of processing for the called processing contents, wherein the execution of processing to be started is recognized by the number of times stored in the table in the memory device, and wherein the number of times and associated information for starting execution of processing are predefined within the table in the memory device.

* * * * *